United States Patent
Niederer et al.

(10) Patent No.: US 10,254,559 B2
(45) Date of Patent: Apr. 9, 2019

(54) OPTICAL DEVICE FOR REDUCING SPECKLE NOISE

(71) Applicant: Optotune AG, Dietikon (CH)

(72) Inventors: David Niederer, Kuttigen (CH); Marcel Suter, Zurich (CH); Manuel Aschwanden, Allenwinden (CH); Selina Casutt, St. Gallen (CH); Damian Schneider, Winterthur (CH)

(73) Assignee: Optotune AG, Dietikon (CH)

( * ) Notice: Subject to any disclaimer, the term of this patent is extended or adjusted under 35 U.S.C. 154(b) by 0 days.

(21) Appl. No.: 15/103,695

(22) PCT Filed: Jul. 22, 2014

(86) PCT No.: PCT/EP2014/065766
§ 371 (c)(1),
(2) Date: Jun. 10, 2016

(87) PCT Pub. No.: WO2015/086166
PCT Pub. Date: Jun. 18, 2015

(65) Prior Publication Data
US 2016/0306183 A1    Oct. 20, 2016

(30) Foreign Application Priority Data

Dec. 10, 2013    (EP) .................................... 13196560

(51) Int. Cl.
*G02B 26/08*    (2006.01)
*G02B 27/48*    (2006.01)
(Continued)

(52) U.S. Cl.
CPC ............... *G02B 27/48* (2013.01); *G02B 5/02* (2013.01); *G02B 26/00* (2013.01); *G02B 26/08* (2013.01);
(Continued)

(58) Field of Classification Search
CPC .......... G02B 27/48; G02B 26/08; G02B 5/02; G02B 26/00; G02B 21/208; H02K 33/00;
(Continued)

(56) References Cited

U.S. PATENT DOCUMENTS

| 2005/0002102 A1 | 1/2005 | Wegmann et al. |
| 2011/0043768 A1 | 2/2011 | Nakayama et al. |

(Continued)

FOREIGN PATENT DOCUMENTS

| CN | 201993525 U | 9/2011 |
| JP | 2005301164 A | 10/2005 |

(Continued)

OTHER PUBLICATIONS

Anonymous, "Electromagnet", Publisher: Wikipedia.

*Primary Examiner* — Euncha P Cherry
(74) *Attorney, Agent, or Firm* — Gable Gotwals

(57) ABSTRACT

The invention relates to an optical device for reducing speckle noise of laser light having a first optical element extending along an extension plane, and an actuator designed for moving the first optical element along the extension plane. The actuator is formed as a reluctance actuator that is designed to exert a reluctance force on the first optical element to move the first optical element along the extension plane.

23 Claims, 21 Drawing Sheets

(51) Int. Cl.
  *H02K 33/00* (2006.01)
  *H02K 33/10* (2006.01)
  *H02K 33/14* (2006.01)
  *G02B 5/02* (2006.01)
  *G02B 26/00* (2006.01)
  *G03B 21/20* (2006.01)
  *H02K 33/02* (2006.01)
(52) U.S. Cl.
  CPC ....... *G03B 21/208* (2013.01); *G03B 21/2033* (2013.01); *H02K 33/00* (2013.01); *H02K 33/02* (2013.01); *H02K 33/10* (2013.01); *H02K 33/14* (2013.01); *H02K 2201/18* (2013.01)
(58) Field of Classification Search
  CPC ........ H02K 33/10; H02K 33/14; H02K 33/02; G03B 21/208; G03B 21/2033
  USPC ...................................... 359/199.3
  See application file for complete search history.

(56) References Cited

U.S. PATENT DOCUMENTS

2012/0206226 A1\* 8/2012 Lee ............... H01F 7/10
                                          335/229
2012/0257099 A1\* 10/2012 Tsai ............ G02B 7/08
                                          348/349

FOREIGN PATENT DOCUMENTS

NL        7414159 A    5/1975
WO     2010078662 A1   7/2010

\* cited by examiner

OPTICAL DEVICE FOR REDUCING SPECKLE NOISE

CROSS-REFERENCE TO RELATED APPLICATIONS

This United States application is the National Phase of PCT Application No. PCT/EP2014/065766 filed 22 Jul. 2014, which claims priority to European Patent Application No. 13196560.0 filed 10 Dec. 2013, each of which is incorporated herein by reference.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

BACKGROUND OF THE INVENTION

The present invention relates to an optical device for reducing Speckle noise according to claim 1.

Such an optical device for reducing Speckle noise of laser light comprises at least first optical element that acts as a diffusor, i.e., scatters light, and that extends along an extension plane as well as an actuator means designed for oscillating said first optical element along said extension plane.

An optical device of the afore-mentioned kind is often used with laser light in order to suppress Speckle noise, which is an interference pattern that is created on the screen (objective speckles) or the retina of the human eye (subjective speckles) due to the high coherency of the laser light.

Such a reduction can be accomplished by letting the light or laser beam pass through or reflect on a moving/oscillating diffuser. In case the frequency is high enough, the human brain integrates the perceived light over time which reduces the perceived speckle noise significantly. Such an optical device is for instance disclosed in US 2011/0043768 which describes a magnet-coil based moving diffuser with complex springs as well as in WO2010078662 which relates to a movable diffuser based on an actuation by means of electroactive polymers

BRIEF SUMMARY OF THE INVENTION

Based on this, the problem underlying the present invention is to provide an optical device adapted for the reduction of Speckle noise that is reliable, reduces costs and special requirements while increasing thermal and mechanical stability at the same time.

This problem is solved by an optical device having the features of claim 1.

According thereto, said actuator means is formed as a reluctance actuator means that is designed to exert a reluctance force on the first optical element, so as to move or stretch the first optical element along said extension plane.

In the context of the present invention, said optical element is preferably designed to act as a diffusor, i.e., spread out or to scatter light in some manner, wherein particularly said optical element can be one of the following elements:

A diffuser, a volume diffuser, a surface diffuser, a diffractive diffuser, a microlense, a line diffuser, a square diffuser, a cylinder lens array, a fly-eye, or a deformable polymer.

Further, in the present invention, the (e.g. first) optical element can be made of a glass, a polymer, an elastomer, a plastic or any other transparent or reflecting material. It can be a surface or an engineered volume etc. (see also above).

Further, a stretching of the optical element for Speckle reduction may be performed in case said first optical element is made out of deformable material such as polymer, wherein the optical properties of the optical element may be altered by stretching it.

In other words, according to the invention, an electromagnetic resonance structure is built, that allows one to reduce cost, spatial requirements, and complexity, while at the same time thermal and mechanical stability is increased. Preferably, the optical device according to the invention is configured to steer light in a controlled manner. It preferably contains a magnetically conductive return structure which at the same time contains a mass-spring system where the optical structure (i.e. diffuser) is fixed on being part of the mass which oscillates continuously.

Generally, at least three different basic designs are preferably employed to allow movement of the flexible part of the magnetic return structure, namely a movement in a direction parallel to the magnetic field, where all structures lie in a common extension plane, a movement in a direction perpendicular to the magnetic field, where all structures lie in a common extension plane, and a movement in a direction perpendicular to the magnetic field, where the structures are perpendicular to the magnetic field direction.

Particularly, this first optical element is moved with respect to the incident laser light. The device may further comprise a static diffuser that is fixed in time and location with respect to the incident laser light. The elastic coupling (spring members etc.) connects the in space-fixed part of the device and the part carrying the moving optical element (e.g. the first magnetic flux guiding structure, see e.g. below).

In order to be able to induce a magnetic flux into the flux guiding structures of the reluctance actuator means at least one coil is used that comprises or consists of a wound wire/conductor. The reluctance actuator means is the driving element that causes the movement of the moving first optical element. It consists of a coil and two magnetic flux guiding structures (see below), but no permanent magnet.

The device may further comprise a housing that can be made e.g. out of a plastic and/or metal or any other suitable material.

Preferably, the reluctance actuator means comprises a first magnetic flux return structure being arranged adjacent to said at least one first coil, and a first magnetic flux guiding structure connected to the first optical element.

Further, preferably, said first magnetic flux guiding structure is separated from said first magnetic flux return structure by a first gap. Preferably, the optical device is designed to apply a varying current signal to said first coil such that magnetic flux generated by the first coil is guided by the first magnetic flux return structure and the first magnetic flux guiding structure (particularly via said first gap) and a resulting reluctance force moves the first magnetic flux guiding structure and therewith the first optical element with respect to the first magnetic flux return structure (or an incident laser beam) along said extension plane.

Throughout the application, the magnetic flux guiding structures may also be denoted as guiding structures while the magnetic flux return structures may also be denoted as return structures as an abbreviation.

Preferably, the first magnetic flux return structure and/or the first magnetic flux guiding structure (as well as all other guiding/return structures described herein) are formed out of or comprise a magnetically soft material such as iron, a magnetically soft ferrite or another suitable material. Said structures are designed to guide and bundle the magnetic flux.

Preferably, the first optical element is connected via an elastic coupling, particularly via at least a first spring member (and eventually a plurality of spring members) to the first magnetic flux return structure (or to a carrier frame of the optical device, to which carrier frame the first return structure, see below). The elastic coupling is designed to provide a restoring force that particularly tries to move the first optical element back into an initial position (e.g. the resting first optical element's position when no resultant reluctance force acts).

In an embodiment of the present invention, said elastic coupling or said at least one spring member is further designed to prevent a pull-in of the reluctance actuator means, particularly by preventing the first magnetic flux guiding structure from snapping to the first magnetic flux return structure. This may be achieved by using spring members that do not deform or deform hardly in a direction along which said pull-in may occur. Instead, these spring members preferably deform in a direction perpendicular to the pull-in direction.

Particularly said elastic coupling elastically couples the first magnetic flux guiding structure to the first magnetic flux return structure or to said carrier frame of the optical device.

Particularly, the elastic coupling (e.g. spring members) are formed out of a metal, which may also be the case for other elastic elements described herein.

Preferably, the optical device comprises a control circuit comprising an electrical energy source designed to apply an electrical current signal to the at least one first coil (or several such signals to a plurality of coils, see e.g. below) of the reluctance actuator means having a tunable/controllable frequency, respectively, wherein said control circuit is designed to control said frequency such that a force on the first optical element (or first magnetic flux guiding structure) resulting from the force of the elastic coupling and the reluctance force excites the first optical element to oscillate along said extension plane in a resonant manner, particularly such that the trajectory of the first optical element corresponds to a Lissajous curve.

The movement (e.g. frequency, position, velocity, acceleration) of the first optical element may be sensed by a corresponding sensor, wherein the sensed actual values may be used to control the movement (e.g. frequency) of the first optical element and/or first magnetic flux guiding structure, i.e., to let the current frequency approach a reference frequency allowing for a resonant excitation of the first optical element/guiding structure.

Preferably, the control circuit is designed to control the frequency of the current applied to the at least one first coil (or the present coils) such that a maximal amplitude or amplitude gain of the movement of the first optical element is achieved which amplitude can be sensed by means of the above sensors (e.g. feedback loop).

Particularly, said control circuit is designed to control the frequency and signal shape of the current applied to the at least one first coil, particularly such that the applied current has a pulse-like signal shape, where the duty cycle of the pulses can be set (e.g. programmed fix) or adjusted by the control circuit, e.g. based on the measured amplitude. Short pulses can be used to minimize the power of the device. The frequency of the pulses are adjusted by the control circuit to maximize the measured amplitude (adjust the mechanical resonance frequency).

The control circuit may be designed that the mechanical resonance frequency of two reluctance actuators can be controlled to have a 90 degree phase-shift to each other in the amplitude.

As a position sensor a capacitive sensor, a Hall sensor or a strain sensor, an optical sensor or any other type of position sensor may be used. The position sensor may be used to measure the movement (e.g. frequency) of the reluctance actuator means. Alternatively, the impedance change of the system can directly be measured using the actuation coils (e.g. first coil), Further, an accelerometer may be used for measuring the acceleration of the moving first optical element.

When the impedance is sensed, the frequency of the current may be adjusted such by means of the control circuit that the change in impedance becomes maximal.

Further, a temperature sensor may be used to detect the temperature of the device, since the resonance frequency changes with temperature. The knowledge of the temperature may be used to control the frequency of the current applied to the coil(s) accordingly, e.g. in order to excite the movement of the first optical element in a resonant manner.

In embodiments of the present invention where the control circuit is designed to control the frequency of the current applied to the at least one first coil (or the present coils) such that a maximal amplitude or amplitude gain of the movement of the first optical element is achieved, the optical device particularly comprises a sensor for detecting or determining the amplitude of the movement of the first optical element.

According to an embodiment of the present invention, this sensor is designed to measure the position, velocity or acceleration of the optical element. From these quantities said amplitude or gain of amplitude of the movement of the first optical element can be determined, e.g. by the sensor or some other unit designed for this task.

According to an embodiment of the present invention, the sensor is designed to measure the position of a magnet connected to the first optical element. For this, the sensor may be designed to sense the magnetic flux generated by the magnet. For instance the sensor may comprise a coil for measuring the magnetic flux of the magnet. Alternatively, the sensor may be a Hall sensor that measures the magnetic field generated by the magnet. From such a measured quantity, the amplitude or amplitude gain of the movement of the magnet or first optical element can be determined. Particularly, the sensor or the control unit is designed to determine said amplitude or amplitude gain from such a measured quantity.

According to a further embodiment of the present invention, the sensor is designed to irradiate the first optical element with light or light pulses and to detect the light reflected by the first optical element or the interruption/influence of the first element on the light in transmission. For this, the sensor may comprise a light source, e.g. an LED (Light Emitting Diode), as well as a light detector, e.g. a phototransistor, for measuring reflected or transmitted light variations. As a light detector also an LED may be used. Further, the sensor may comprise a light source (actuation source) for actuating a fluorescent material on the first optical element which illuminates a light detector (phototransistor or LED that is also configured as a light detector) to sense the movement e.g. by the light intensity. From the detected light, the amplitude or amplitude gain of the movement of the magnet or first optical element can be determined. Particularly, the sensor or the control unit is designed to determine said amplitude or amplitude gain from the detected reflected/transmitted light.

According to a further embodiment of the present invention, the sensor is designed to maximize the amplitude of the resonator by measuring the magnetic reluctance. The magnetic reluctance depends on the gap.

According to a further embodiment of the present invention, the sensor is designed to maximize the amplitude of the resonator by measuring the magnetic flux in the guidance structure, which also depends on the gap. The reluctance change can be measured by measuring the change of the magnetic flux, by inductance/impedance sensing, induced voltage sensing, measuring current in the coil or determine a time constant. Single or several activation or measurement pulses can be used.

The reluctance can be measured by the actuation coil or a measurement coil within the magnetic guiding structure by the inductance (e.g. using $L(t)=N^2/R(t)$, where L is the inductance, N is the number of windings, and R is the reluctance), or measuring the current or voltage or measuring a time constant of the current or voltage (e.g. using $u(t)=L(t)di/dt$, where $u(t)$ is the voltage, L is the inductance, and i is the current).

Furthermore, the magnetic flux can be measured by an additional sensing coil by measuring the induced voltage (e.g. using $u(t)=-N*d\phi/dt$, where $u(t)$ is the induced voltage, L is the inductance and $\phi$ is the magnetic flux).

The sensing coil can be mounted at any place on the magnetic flux guidance structure.

According to a further embodiment of the present invention, the sensor is designed to measure a change in capacitance between the moving first optical element and another area of the optical device or a second device, in particular a nearby electrode. Particularly, two or several capacitive sensors are measured differentially to cancel noise. The capacitive sensor may be integrated into a PCB (Printed Circuit Board) of the optical device. Alternatively, the sensor may be designed to measure a change in an electrical field due to the moving first optical element. When using such a capacitive sensor, the first optical element and/or said other area of the optical device can comprise a teeth or comb structure to increase the capacity due to the first optical element and said area.

From the measured capacitance or electrical field, the amplitude or amplitude gain of the movement of the magnet or first optical element can be determined. Particularly, the sensor or the control unit is designed to determine said amplitude or amplitude gain from one of these measured quantities.

According to a further embodiment of the present invention, the sensor is designed to measure the acceleration of the first optical element. For this, the sensor may comprise a piezoelectric element. From the measured signal of the piezo element/sensor, the amplitude or amplitude gain of the movement of the magnet or first optical element can be determined. Particularly, the accelerometer can be place on an attached device (e.g. PCB). Particularly, the sensor or the control unit is designed to determine said amplitude or amplitude gain from said measured signal.

According to a further embodiment of the present invention, the sensor is designed to measure the movement of the first optical element acoustically. For this, the sensor may comprise a first microphone. May several microphone are used to measure differentially and cancel the background noise. From the measured sound, the amplitude or amplitude gain of the movement of the magnet or first optical element can be determined. Particularly, the sensor or the control unit is designed to determine said amplitude or amplitude gain from the measured sound.

According to a further embodiment of the present invention, the sensor is designed to measure a strain of the elastic coupling. For this, the sensor may comprise a strain gauge, e.g. based on the piezoresistive or piezoelectric effect. The sensor may be placed on said elastic coupling (e.g. spring). From the measured strain, the amplitude or amplitude gain of the movement of the magnet or first optical element can be determined. Particularly, the sensor or the control unit is designed to determine said amplitude or amplitude gain from the measured strain.

According to a further embodiment of the present invention, the sensor is designed to measure the current in an electrical conductor extending along the first optical element. For this, the sensor may comprise a hot wire anemometer. Here, the electrical conductor (e.g. wire) is placed adjacent the first optical element. The sensor applies an electrical current to said conductor and measures it. When the first optical element is moving, air and therefore heat is transported away from the conductor according to the movement of the first optical element. Thus the movement of the first optical element generates a varying temperature of the conductor and therefore a varying resistance leasing to a corresponding variation in the current through the conductor that can be measured. From the measured current, the amplitude or amplitude gain of the movement of the magnet or first optical element can be determined. Particularly, the sensor or the control unit is designed to determine said amplitude or amplitude gain from the measured electrical current.

Generally, all measurements made by the sensor described above can be made in a single-ended fashion or in a differential fashion.

According to a further embodiment of the present invention, a control of the current can be omitted by using a chirp signal on the actuation coil, i.e., the control circuit is now designed to sweep the frequency within a defined frequency range to actuate the resonator at around the resonance frequency. According to an embodiment of the present invention, the first magnetic flux guiding structure and/or the first magnetic flux return structure extend circumferentially along said extension plane of the first optical element, wherein particularly the at least one first coil and/or the first magnetic flux return structure surround the first magnetic flux guiding structure.

According to an embodiment of the present invention, the first coil (particularly the first coil may in fact be the only coil of the reluctance actuator) comprises an electrically conducting conductor (e.g. wire) wound around a coil axis running perpendicular to said extension plane (i.e. the first coil extends circumferentially along said extension plane of the moving first optical element.

According to an embodiment of the present invention, the first magnetic flux guiding structure is arranged in an (e.g. slightly) off-centered initial position (i.e., the first magnetic flux guiding structure rests with respect to the first return structure and no reluctance force acts on it) with respect to the (e.g. surrounding) first magnetic flux return structure, particularly such that the first magnetic flux guiding structure is separated from the first magnetic flux return structure by a circumferential first gap having a narrowest portion, wherein particularly said control circuit is designed to apply a current to the at least one first coil in a manner that the first magnetic flux guiding structure (and therewith the first optical element) is moved towards the first magnetic flux return structure into a starting position thereby further reducing the width of the first gap in the region of said narrowest portion, wherein the control circuit is further designed to repeatedly control the current such that the resulting reluctance force and the elastic coupling [e.g. first spring member and/or second spring member, see below] generate a periodic two-dimensional movement (oscillation) of first magnetic guiding structure and therewith of the first optical element.

According to a further embodiment of the present invention, the first magnetic flux guiding structure and the first magnetic flux return structure each comprise at least one protrusion, wherein said protrusions are arranged offset along a first direction. Further, preferably the first magnetic flux guiding structure and the first magnetic flux return structure form said first gap that extends in a second direction running perpendicular to the first direction. Furthermore, said control circuit is preferably designed to apply a current signal to the at least one first coil so that a reluctance force is generated that pulls the first magnetic flux return structure towards the first magnetic flux return structure along the first direction such that the width of the first gap and said offset between said protrusions is reduced. This in turn causes the generation of a further reluctance force which pulls the first magnetic flux guiding structure towards the first magnetic flux return structure along the second direction.

According to a further embodiment of the present invention, the reluctance actuator means of the optical device comprises a second magnetic flux return structure extending circumferentially along said extension plane of the first optical element, as well as a second coil comprising an electrically conducting conductor (e.g. wire) wound around a coil axis running perpendicular to said extension plane (i.e. the second coil extends circumferentially along said extension plane). Preferably the coil axes of the first and the second coil coincide, wherein particularly said second magnetic flux return structure extends parallel to the first magnetic flux return structure and faces the first magnetic flux return structure along said coil axis (or perpendicular to said extension plane). Further, preferably, the second coil and/or the second magnetic flux return structure surround the first magnetic flux guiding structure.

According to a further embodiment of the present invention, the first magnetic flux guiding structure comprises an (e.g. rectangular) frame to which said first optical element is connected, wherein particularly said frame comprises an upper side as well as a lower side facing away from said upper side. Preferably, a first and a second lower protrusion protrude from the lower side of the frame such that they face each other in a first direction running parallel to said extension plane. Further, preferably the first lower protrusion forms a first gap with the first (lower) magnetic flux return structure, wherein particularly the second lower protrusion forms a parallel second gap with the first (lower) magnetic flux return structure. Preferably, in an initial position, the width of the first gap is smaller than the width of the second gap. Furthermore, preferably, a first and a second upper protrusion protrude from the upper side of the frame such that they face each other in a second direction running perpendicular to the first direction and parallel to said extension plane, wherein particularly the first upper protrusion forms a first gap with the second (upper) magnetic flux return structure, and wherein particularly the second upper protrusion forms a parallel second gap with the second (upper) magnetic flux return structure. Preferably, in an initial position, the width of the first gap is smaller than the width of the second gap. Further, preferably the control unit is designed to apply a first current to the first coil and a second current to the second coil so that reluctance forces are generated, respectively, which move the first magnetic flux return structure towards the first magnetic flux return structure in the first direction and/or in the second direction.

According to a further embodiment of the present invention, the first magnetic flux return structure comprises a second coil opposing the first coil, wherein the coil axes are aligned with each other and extend along said extension plane. Further, preferably, the first magnetic flux return structure and the first magnetic flux guiding structure define said first gap as well as a second gap, wherein in each gap a projection of the first magnetic flux return structure is arranged offset from a projection of the first magnetic flux guiding structure. Further, preferably the control circuit is arranged to apply a first current to the first coil as well as second current to the second coil such that the projections in the first gap and in the second gap periodically align with each other due to a resulting reluctance force and the first magnetic flux guiding structure and therewith the first optical element is moved back and forth along the two opposing coils.

In a further variant, a second reluctance actuator means may be present, comprising a second magnetic flux return structure, a second magnetic flux return structure, a further first coil and a further second coil arranged on the second magnetic flux return structure, respectively, as well as a second optical element (the second optical element may also be any kind of a diffuser as described in connection with the first optical element) connected to the second magnetic flux guiding structure, wherein preferably the second reluctance actuator means is configured like the first reluctance actuator means, wherein however the second reluctance actuator means is arranged with respect to the first reluctance actuator means such that the two optical elements extend parallel with respect to each other (particularly in a congruent manner) along said extension plane (although they may be spaced apart from each other normal to said extension plane], wherein the second reluctance actuator is rotated with respect to the first reluctance actuator means about the normal to the extension plane by 90° so that the two optical elements can be moved along perpendicular directions.

According to a further embodiment of the present invention, the coil axis of the first coil runs parallel or in said extension plane along which the first optical element extends (i.e. first coil extends circumferentially across said extension plane).

According to a further embodiment of the present invention, the first magnetic flux return structure, the first magnetic flux guiding structure, and the elastic coupling between the first magnetic flux guiding structure and the first magnetic flux return structure are formed as flat (e.g. metal) plate members extending in a common extension plane (further, this plane may coincide with the extension plane of the first optical element that is connected to a frame of the first magnetic flux guiding structure). Further, preferably, the first magnetic flux return structure, the first magnetic flux guiding structure and the elastic coupling are integrally connected to each other. Particularly, the first magnetic flux return structure, the first magnetic flux guiding structure and the elastic coupling are made, particularly cut or stamped, from a single sheet of metal. However, each of these components or may also be formed as a separate part. These separate parts may be connected by means of welding or other suitable connections.

Preferably, the first magnetic flux return structure comprises three neighboring protrusions, namely a middle protrusion and two lateral protrusions each protruding along a first direction from a base of the first magnetic flux return structure, wherein said protrusions are preferably integrally connected to said base, and wherein said at least one first coil preferably encompasses the middle protrusion such that its coil axis runs parallel to said first direction.

Further, preferably, the first magnetic flux guiding structure extends perpendicular to said first direction along said protrusions such that said the first gap is formed between a face side of said protrusions and the first magnetic flux guiding structure.

Furthermore, the optical device preferably comprises a carrier frame formed as a flat plate member, too, wherein the first magnetic flux guiding structure is integrally hinged to the carrier frame so that the first magnetic flux return structure can be bent away from the carrier frame so as to be able to arrange the first coil on the middle protrusion.

Further, preferably, the first optical element is connected via a circumferential outer edge region to a frame for holding the first optical element that is connected to the first magnetic flux guiding structure for moving the first optical element.

Furthermore, the reluctance actuator means is preferably designed to pull the first magnetic flux guiding structure and therewith the frame for holding the first optical element towards the first magnetic flux return structure along the first direction (and along said common extension plane) thus reducing the width of the first gap, or to move the first magnetic flux guiding structure along the first magnetic flux return structure in a second direction running perpendicular to the first direction (and along said common extension plane).

Preferably, the first magnetic flux guiding structure as well as the frame for holding the first optical element is integrally hinged to the carrier frame via said elastic coupling so that the frame for holding the first optical element can be excited to oscillate along the first and/or second direction by means of the control circuit and the elastic coupling, i.e., a linear oscillation as well as a two-dimensional oscillations (e.g. Lissajous figures are possible.

According to a further embodiment of the present invention, the first magnetic flux return structure or the optical device comprises an annular or circumferential (e.g. circular or rectangular) frame wherein said first coil, as well as particularly a second coil and a third coil (which are formed like the first coil) of the reluctance actuator means are each wound around an associated first protrusion (it is also possible to use less or more coils). Preferably, said first protrusions each protrude inwardly from said frame (e.g. towards a center of the frame or towards a central region inside the frame), such that the coil axes extend along said extension plane. Furthermore, a second protrusion preferably protrudes inwardly from said frame adjacent to each first protrusion. Preferably, the first magnetic flux guiding structure comprises an annular or circumferential (e.g. circular or rectangular) shape and is particularly connected via one, two, three or more spring members to the frame.

Further, preferably, each pair of a first and an adjacent second protrusion forms a gap with the first magnetic flux guiding structure.

In this regards, the control circuit is preferably designed to apply a current signal to each coil so that the first magnetic flux return structure and therewith the first optical element performs a periodic two-dimensional movement along said extension plane. Preferably, adjacent spring members are arranged at 120° with respect to each other.

According to a further embodiment of the present invention, the optical device may comprise at least one or two balancing masses compensating the excited oscillation of the first optical element so that particularly the optical device does not transmit oscillations or transmits less oscillations to a surrounding coupled to the optical device.

Generally, a stacking of two optical devices according to the invention is possible. Combining 1D oscillations in this way by a 90° rotation results in a 2D oscillation with two moving optical elements. Further, different (eigen)frequencies along different axes (e.g. first and second direction) result in desired Lissajou figures, as stated above. Further, different drive (current) signals are possible, for example sine, square, pulse or varying frequencies. Further, the optical device according to the invention can be embedded into a noise cancelling housing.

Generally, optical device according to the invention may comprise, besides the first optical element (e.g. diffuser, see above), a second optical element which can be a second moveable optical element (e.g. diffuser, see above) that may be moved like the first optical element, for instance in a different direction. Alternatively, the second optical element may be a static diffuser that is not moved by means of an actuator. Further, a static diffuser may also be combined with two moving optical elements (e.g. moving diffuser) as described above.

There are various fields of application of the optical device according to the invention, which may be used for Speckle reduction in projectors, laser TV, cinema projectors, head-up displays, especially holographic head-up displays (particularly head-up displays for automotive, cars, transportation, simulation stations, consumer products), industrial applications, lighting, machine vision, laser processing, metrology, medical equipment, motion tracking, microscopes, research, surveillance cameras, automotive, range finder bar code readers.

Further, the optical device may comprise a housing or any other part being formed out of a plastic (e.g. an injection molded thermoplastic part).

Preferably, the optical device comprises such a part which is formed as an MID (i.e. a molded interconnect device) which comprises integrated electronic circuit traces. Particularly the control circuit of the optical device or any other electronics is integrated into this part. Particularly said part may be a part of the housing of the present optical device or any other part of the device.

According to a further aspect of the invention a projector is disclosed, comprising an integrator rod or a beam homogenizer, as well as an optical device according to the invention, wherein said optical device is arranged, particularly directly arranged, in front of said integrator rod or beam homogenizer, particularly in order to provide said integrator rod or beam homogenizer with speckle-free or speckle-reduced light.

According to an embodiment of the projector, a light angle intensity distribution modifying element, in particular an axicon, is placed in front of the optical device.

Advantageous embodiments of the present invention relating to the optical device and the projector are also stated in the sub claims.

BRIEF DESCRIPTION OF THE DRAWINGS

In the following, further advantages and features of the present invention as well as embodiments of the present invention are described with reference to the Figures, wherein.

DETAILED DESCRIPTION OF THE PREFERRED EMBODIMENTS

Figure 1:
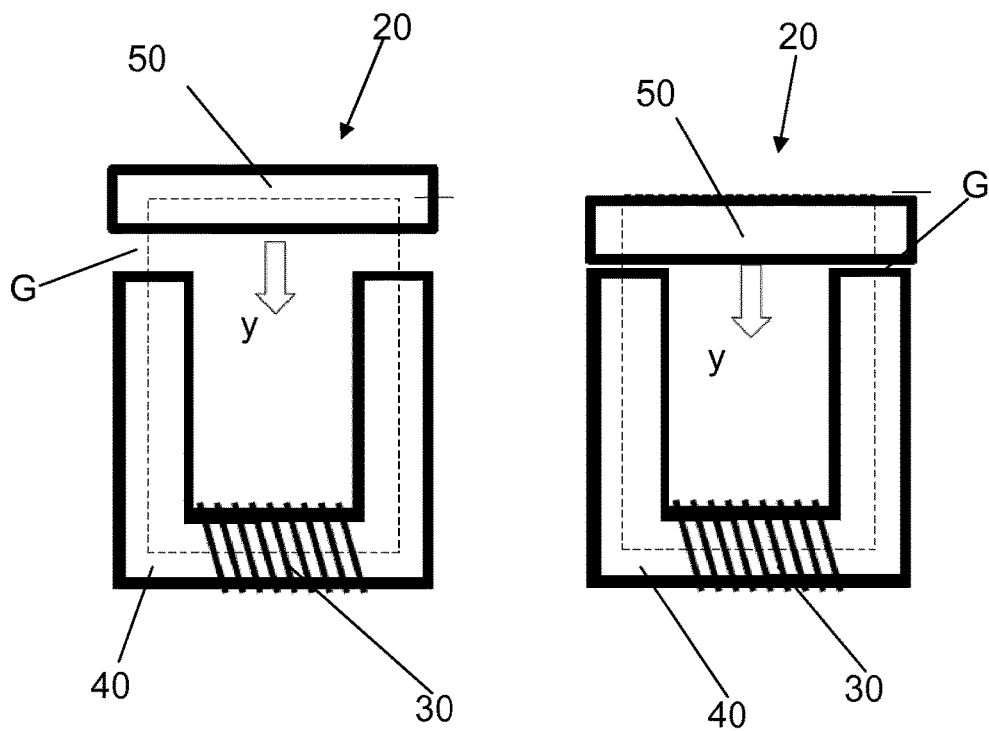
FIGS. 1-4 show different schematical views of different configurations of a first magnetic flux return structure, a first magnetic flux guiding structure, and a coil arranged on the first magnetic flux return structure.
Figure 2:
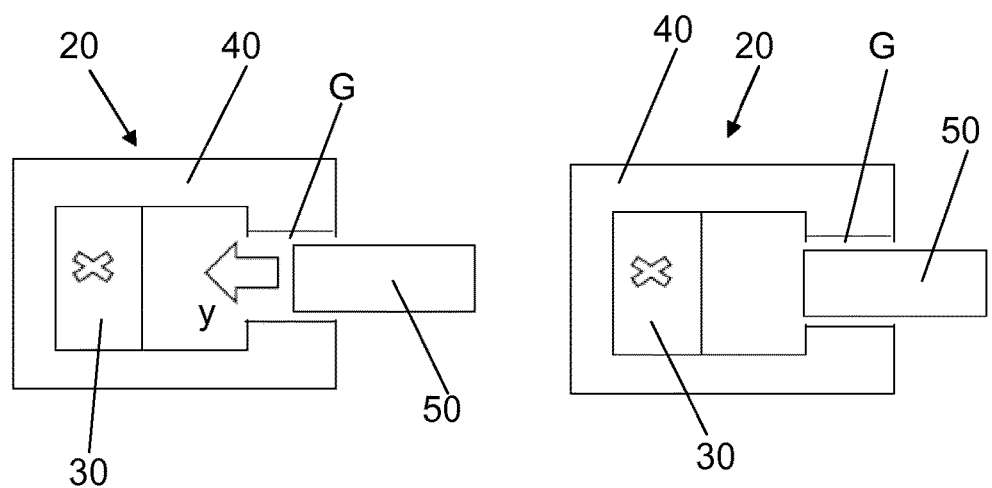
Figure 3:
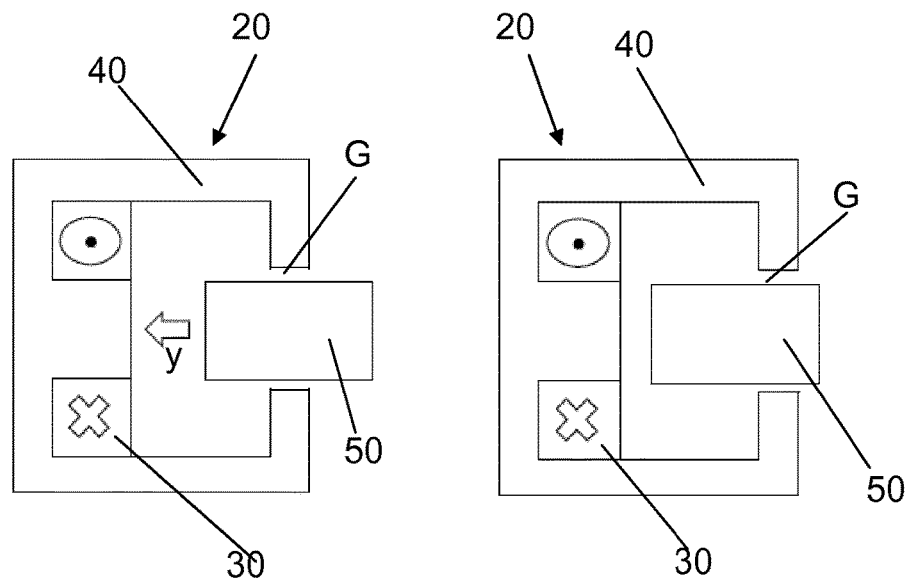
Figure 4:
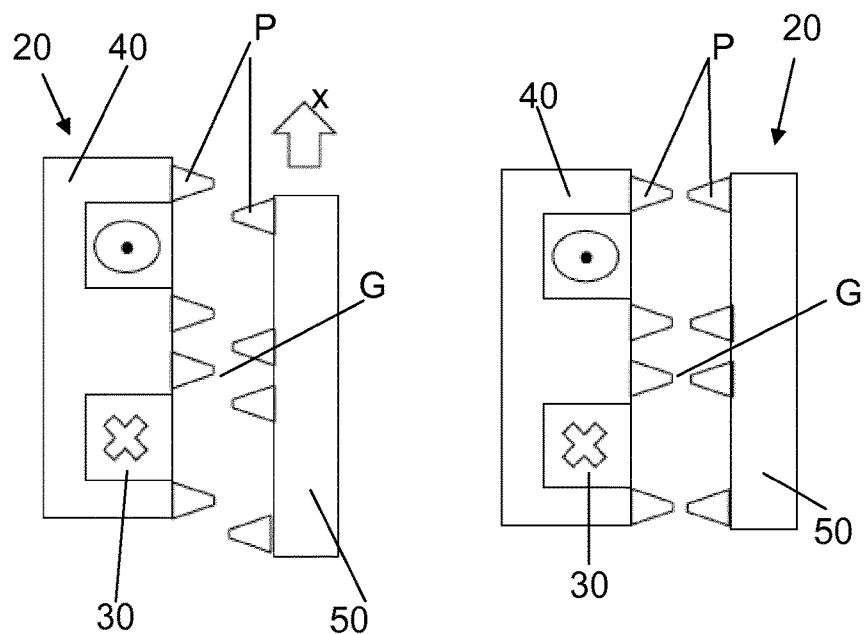

The present invention relates to optical devices 1 for Speckle noise reduction. Such a device 1 comprise a first optical element 10, e.g. some kind of a diffuser, extending along an extension plane, a reluctance actuator means 20 designed for moving said first optical element 10 along said extension plane. The incident light beam is not shown herein, but may be considered to impinge normally with respect to said extension plane on the first optical element or under some angle with respect to said normal. Preferably, as shown in FIGS. 1 to 4, such an actuator 20 comprises a first electrically conducting coil 30, a first magnetic flux return structure 40 being arranged adjacent to said first coil 30, and a first magnetic flux guiding structure 50 connected to the first optical element 10, wherein said first magnetic flux guiding structure 50 is particularly separated from said first magnetic flux return structure 40 by a first gap G. In case a suitable current is applied to the first coil 30, a resulting reluctance force $$F_R = -\frac{1}{2} \cdot I^2 \cdot N^2 \cdot A \cdot \mu_0 \cdot \frac{1}{(L_{Luft\ Gap1} + L_{Luft\ Gap2})^2}$$

moves the first magnetic flux guiding structure 50 and therewith the first optical element 10 (see below) towards the first magnetic flux return structure 40 as shown in FIGS. 1 to 3. Here, N is the number of, I is the current, A is the area through which the magnetic flux flows, and L is the gap size.

In case the guiding and return structures comprise offset teeth or projections P, the generated force is also perpendicular to the afore-mentioned one.

For controlling the reluctance actuator means, a control circuit is provided that comprises an electrical energy source designed to apply an electrical current signal I to the at least one first coil 30 (or several such signals to a plurality of coils, see e.g. below) of the reluctance actuator means 20 having a controllable frequency, wherein said control circuit is designed to control said frequency such that a force on the first optical element 10 (or on the first magnetic flux guiding structure 50) resulting from the force due to an elastic support 60 of the first optical element 10 and the reluctance force excites the first optical element 10 to oscillate along said extension, particularly such that the trajectory of the first optical element 10 corresponds to a Lissajous figure and the oscillation is in a resonant manner.

Figure 5:
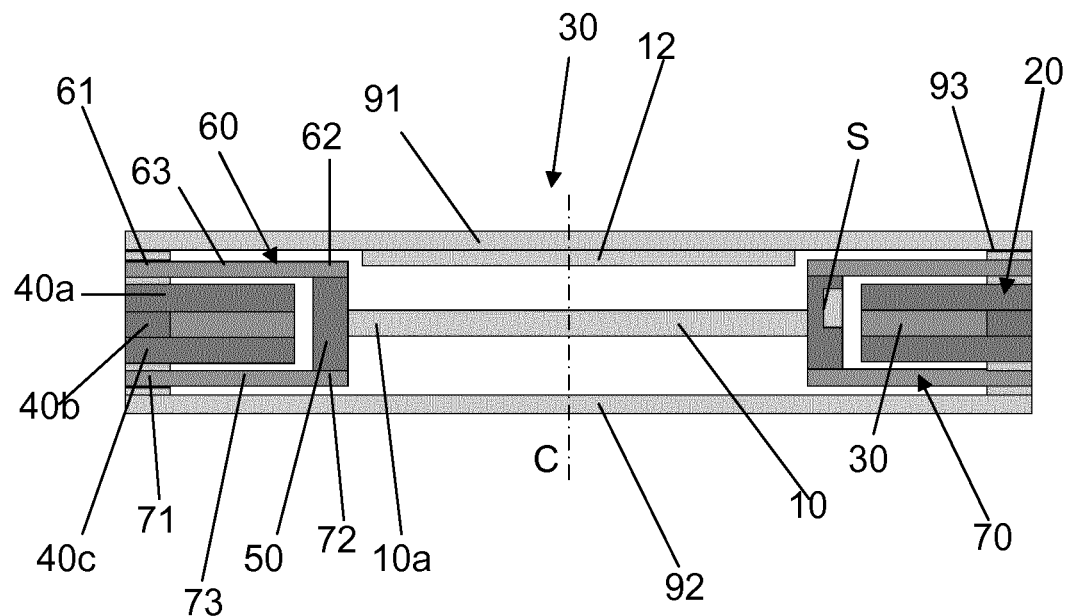
FIGS. 5-7 show different schematical views of an embodiment of the present invention, where the first coil extends along the extension plane of the movable first optical element allowing for a 2D oscillation of the first optical element.
Figure 6:
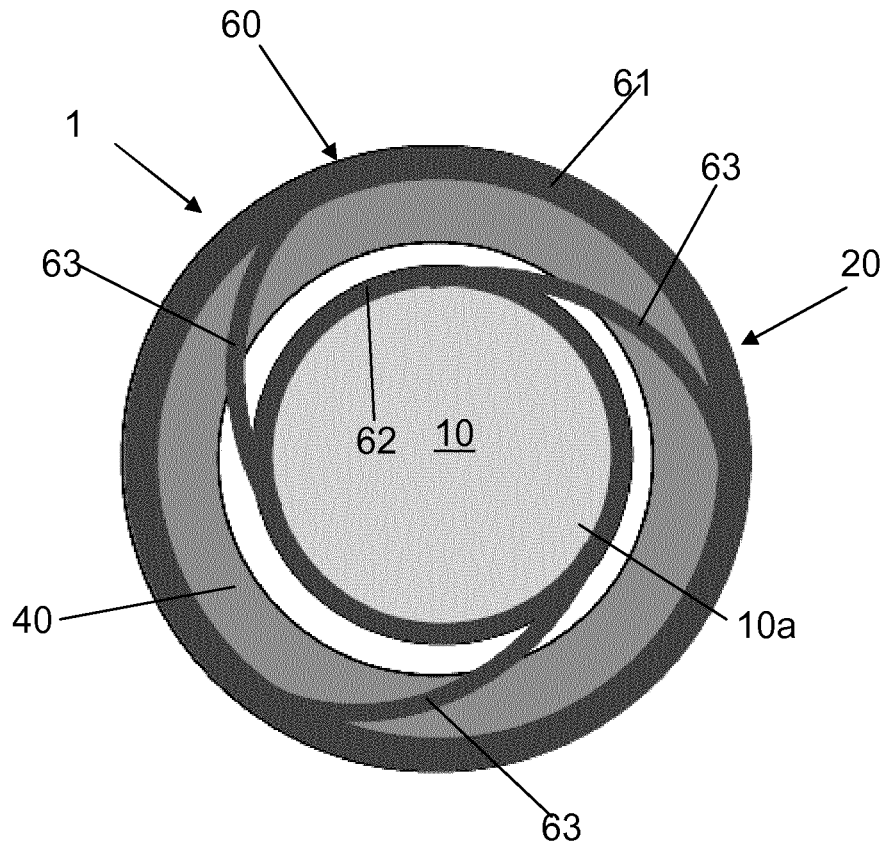
Figure 7:
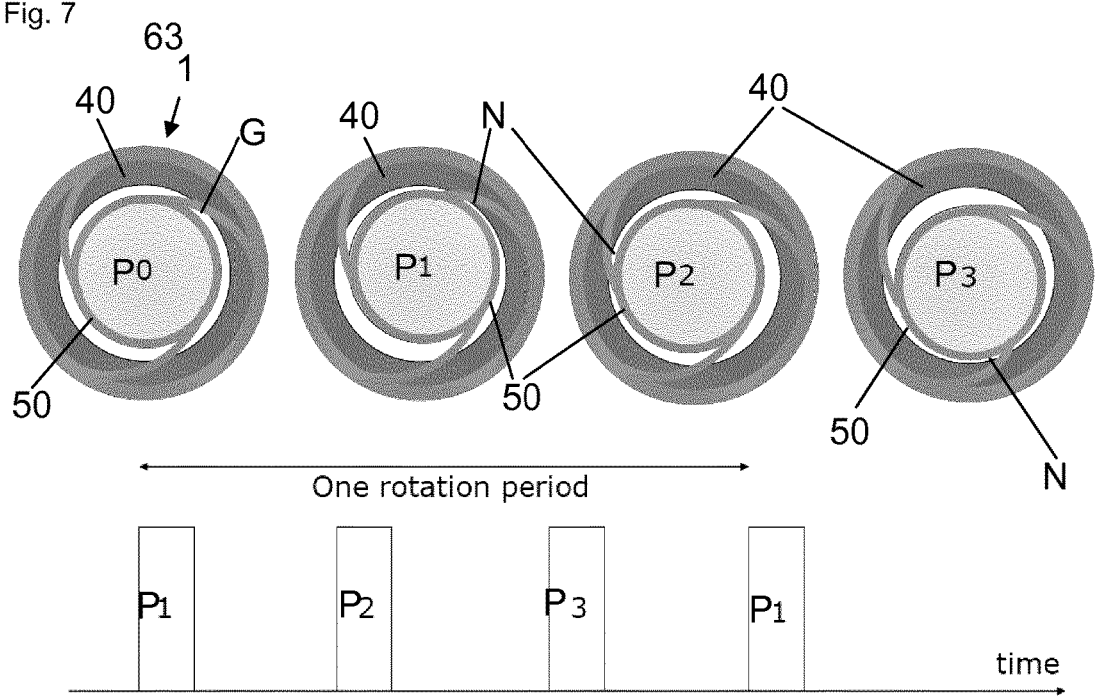

As shown in FIGS. 5 to 7, the optical device 1 may comprise a first magnetic flux guiding structure 50 and a first magnetic flux return structure 40 that extend circumferentially along the extension plane of the first optical element 10, wherein the at least one first coil 30 and the first magnetic flux return structure 40 surround the first magnetic flux guiding structure 50.

Here, the first coil 30 is the only coil of the device and comprises an electrically conducting conductor (e.g. wire) wound around a coil axis C running perpendicular to said extension plane of the first optical element 10 (i.e. first coil extends circumferentially along said extension plane).

Preferably, the first magnetic flux return structure 40 surrounds the at least one first coil 30. For this, the first magnetic flux return structure 40 comprises three metal rings 40a, 40b, 40c placed on top of one another, wherein the middle metal ring 40b comprises a smaller width so that a recess is formed for receiving the first coil 30 which is thus in cross section encompassed by the first magnetic flux return structure 40 from three sides, wherein the middle ring 40b surrounds the first coil 30.

Further, as indicated in FIGS. 5 to 7, the first optical element 10 is connected to the first magnetic flux guiding structure 50 via a circumferential outer edge region 10a of the first optical element 10.

In order to establish said elastic coupling, the first magnetic flux guiding structure 50 is connected to the magnetic flux return structure 40 via a first spring member 60, wherein particularly said first spring member 60 comprises an (e.g. metal) outer ring 61 and an (e.g. metal) inner ring 62 surrounded by the outer ring 61, wherein said rings 61, 62 are connected (e.g. integrally) by three particularly curved and elastically deformable legs 63 (e.g. out of a metal, too) extending from the inner ring 62 towards the outer ring 61, wherein particularly said legs 63 protrude tangentially from the inner ring 62, and wherein particularly the points from which said legs 63 protrude from the inner ring 62 towards the outer ring 61 are equally spaced along the periphery of the inner ring 62.

Further, as shown in FIG. 5, the first magnetic flux guiding structure 50 is connected to the first magnetic flux return structure 40 via a second spring member 70, wherein particularly said second spring member 70 comprises an outer ring 71 and an inner ring 72 surrounded by the outer ring 71, wherein said rings 71, 72 are connected (e.g. integrally) by three particularly curved legs 73 extending from the inner ring 72 towards the outer ring 71, wherein particularly said legs 73 protrude tangentially from the inner ring 72, and wherein particularly the points from which said legs 73 protrude from the inner ring 72 towards the outer ring 71 are equally spaced along the periphery of the inner ring 2. Particularly, the second spring member 70 is formed congruent with the first spring member 60. Particularly, the two spring members 60, 70 face each other along the coil axis C, wherein particularly the outer ring 61 of the first spring member 60 is attached to an (e.g. circumferential) upper side of the first magnetic flux return structure 40, while the inner ring 62 of the first spring member 60 is attached to an (e.g. circumferential) upper side of the first magnetic flux guiding structure 50. Likewise, the outer ring 71 of the second spring member 70 is preferably attached to an (e.g. circumferential) lower side of the first magnetic flux return structure 40, which lower side faces away from the upper side of the first magnetic flux return structure 40, while the inner ring 72 of the second spring member 70 is attached to an (e.g. circumferential) lower side of the first magnetic flux guiding structure 50, which lower side faces away from the upper side of the first magnetic flux guiding structure 50 of the optical device 1.

Further, the spring members 60, 70 are connected to the first magnetic flux return structure 40 (namely to the upper and lower ring 40a, 40c) via spacers 93. Thus the spring members 60, 70 do not abrade on the return structure 40.

Further, a top and a bottom transparent cover element (e.g. glass or any other transparent material) 91, 92 are connected via spacers 93 and via the spring members 60, 70 to the return structure 40. Here, a static diffuser 12 is attached to the top cover element 91. Such cover elements and additional static diffusers may be present in all embodiments. Further, a sensor S is attached to the first magnetic flux guiding structure 50 which is designed to measure the movement of the first magnetic flux guiding structure or of the first optical element 10 (e.g. position, frequency etc.) the sensor provides an output signal or feedback signal, e.g. in the form of a current value of the measured quantity (position, frequency etc.) which is used by the control circuit described herein in order to control the current(s) applied to the coil(s) 30 such that the first optical element 10 is excited to perform oscillation (1D or 2D in resonance).

As further shown in FIG. 7, the first magnetic flux guiding structure 50 is arranged in an e.g. slightly off-centered initial position P0 (i.e. the first magnetic flux guiding structure 50 rests with respect to the first return structure 40 and no reluctance force acts on it) with respect to the e.g. surrounding first magnetic flux return structure 40, particularly such that the first magnetic flux guiding structure 50 is separated from the first magnetic flux return structure 40 by a circumferential first gap G having a narrowest portion N, wherein particularly said control circuit is designed to apply a current I to the at least one first coil 30 in a manner that the first magnetic flux guiding structure 50 and therewith the first optical element 10 are moved towards the first magnetic flux return structure 40 into a starting position P1 thereby further reducing the width of the first gap G in the region of said narrowest portion N, wherein the control circuit is further designed to control the current I such that the resulting reluctance force and the elastic coupling 60, 70 (see above) generate a periodic two-dimensional movement of the first magnetic flux guiding structure 50.

Figure 12:
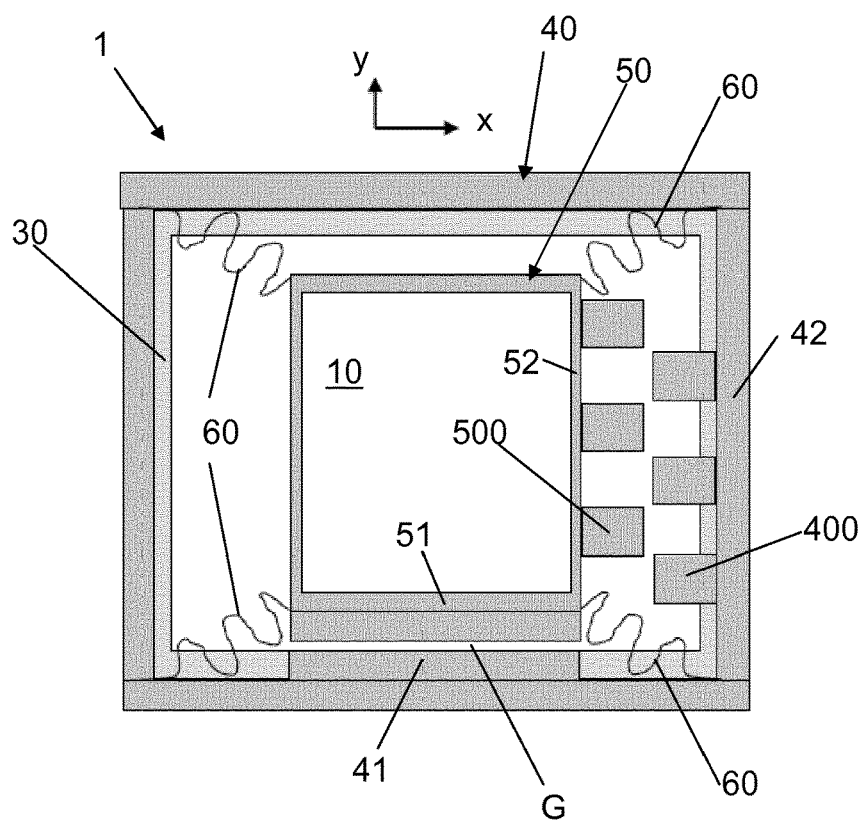
FIGS. 12-14 show different views of a further embodiment of the present invention relating to an optical device for reducing Speckle noise having a first coil extending along an extension plane of the first optical element and allowing for 2D oscillations of the first optical element.
Figure 13:
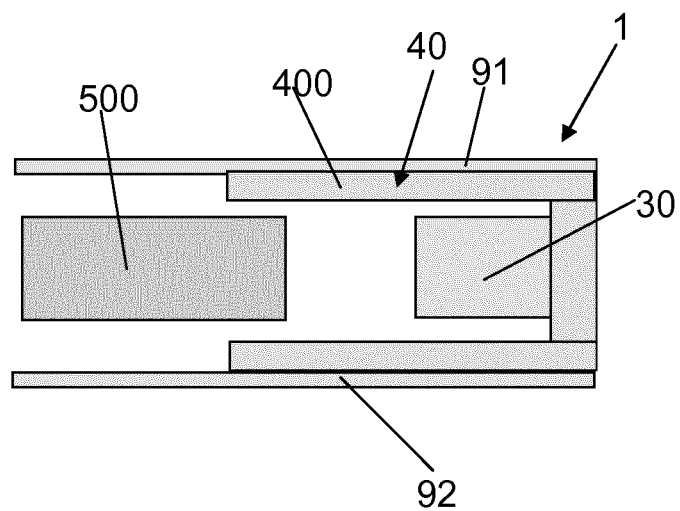
Figure 14:
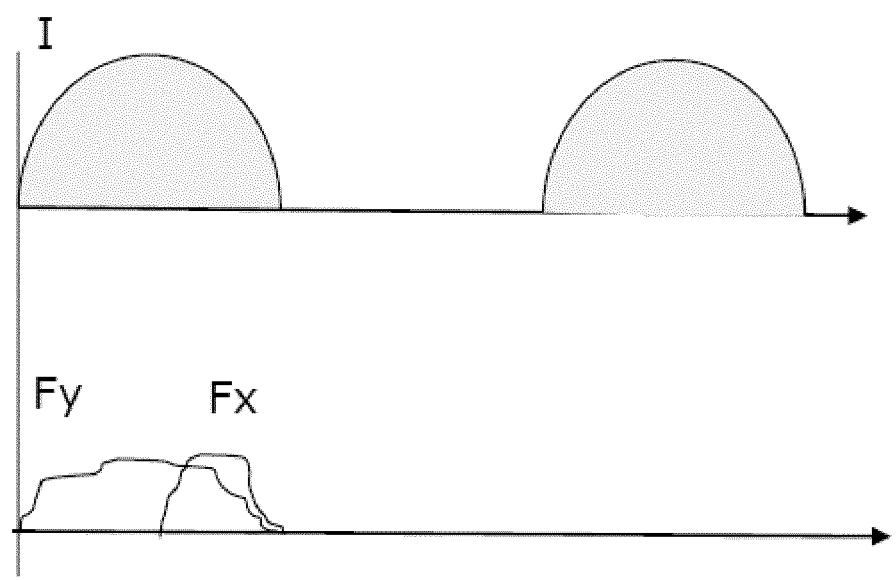

Further, FIGS. 12 to 14 shown an embodiment, where the first magnetic flux guiding structure 50 is formed as a rectangular frame extending along said extension plane of the moving first optical element 10, the first magnetic flux guiding structure 50 having a first leg 51 and a second leg 52 extending parallel to said extension plane, respectively, wherein the second leg 52 is connected to the first leg 51 and extends perpendicular to the first leg 51.

Further, the first magnetic flux return structure 40 is formed as a rectangular frame extending along said extension plane of the first optical element 10, too, the first magnetic flux return structure 40 having a first leg 41 and a second leg 42 extending parallel to said extension plane, respectively, wherein the second leg 42 of the first magnetic flux return structure 40 is connected to the first leg 41 of the first magnetic flux return structure 40 and extends perpendicular to the first leg 41 of the first magnetic flux return structure 40.

Furthermore, the first leg 41 of the first magnetic flux return structure 40 runs parallel to the first leg 51 of the magnetic flux guiding structure 50, wherein the second leg 42 of the first magnetic flux return structure 40 runs parallel to the second leg 52 of the first magnetic flux guiding structure 50.

Further, the first magnetic flux guiding structure 50 comprises at least one protrusion 500 protruding (e.g. perpendicularly) from the second leg 52 of the first magnetic flux guiding structure 50 along a longitudinal extension direction x of the first leg 51 of the first magnetic flux guiding structure 50 towards the second leg 42 of the surrounding first magnetic flux return structure 40.

Preferably, the first magnetic flux return structure 40 comprises at least one protrusion 400 protruding (e.g. perpendicularly) from the second leg 42 of the first magnetic flux return structure 40 along said longitudinal extension direction x of the first leg 51 of the first magnetic flux guiding structure 50 towards the second leg 52 of the first magnetic flux guiding structure 50.

Preferably, the at least one protrusion 400 of the first magnetic flux return structure 40 is arranged offset the other protrusion 500 of the first magnetic flux guiding structure 50 along a longitudinal extension direction y of the second leg 42 of the first magnetic flux return structure 40, the protrusion 400 of the first magnetic flux return structure 40 being closer to the first leg 41 of the first magnetic flux return structure 40 along said longitudinal extension direction y of the second leg 42 of the first magnetic flux return structure 40 than the at least one protrusion 500 of the first magnetic flux guiding structure 50.

Further, preferably, the first leg 51 of the first magnetic flux guiding structure 50 is separated from the first leg 41 of the first magnetic flux return structure 40 by said first gap G.

Preferably, the optical device 1 comprises four spring members 60 connecting the first magnetic flux guiding structure 50 to the first magnetic flux return structure 40, wherein particularly said spring members 60 each connect a different corner of the first magnetic flux guiding structure 50 to an associated corner of the first magnetic flux return structure 40. Preferably, each of said spring members 60 comprises an elongated meandering shape.

Preferably, the control circuit is designed to apply a current I to the at least one first coil 30 so that a reluctance force Fy is generated that pulls the first magnetic flux guiding structure 50 towards the first magnetic flux return structure 40 along the longitudinal extension direction y of the second leg 42 of the first magnetic flux return structure 40, such that the offset between said protrusions 400, 500 is reduced in a way that a further reluctance force Fx is generated which pulls the first magnetic flux guiding structure 50 towards the first magnetic flux return structure 40 along the longitudinal extension direction x of the first leg 41 of the first magnetic flux return structure 40 resulting in a continuous rotational movement of the diffuser when the current I is continuously turned on and off.

Figure 8:
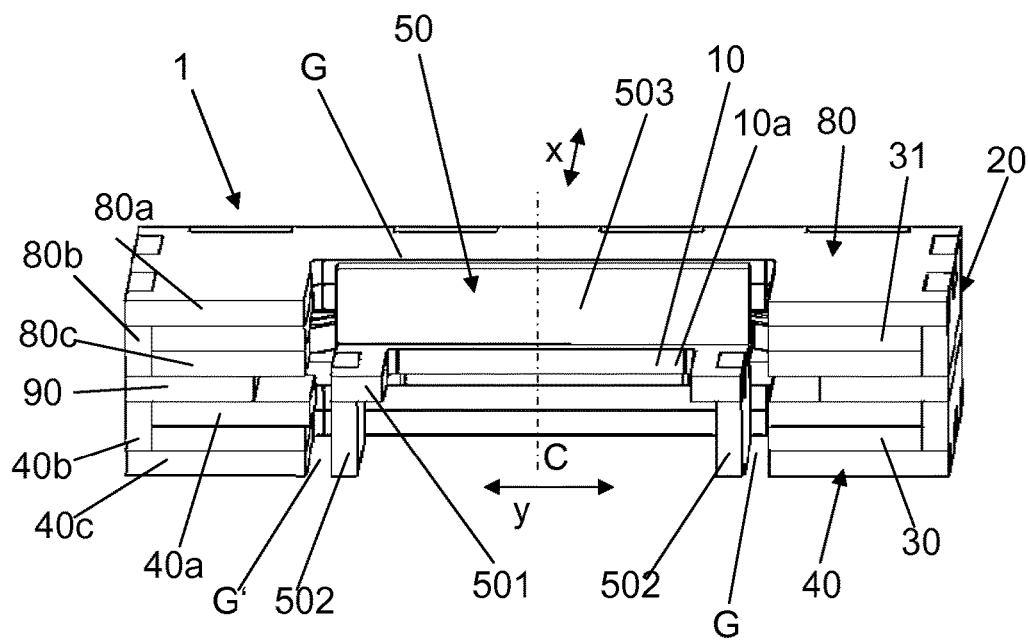
FIGS. 8-10 show different views of a further embodiment of the present invention comprising two parallel coils in an upper and a lower magnetic flux return structure allowing for a 2D oscillation of the first optical element.
Figure 9:
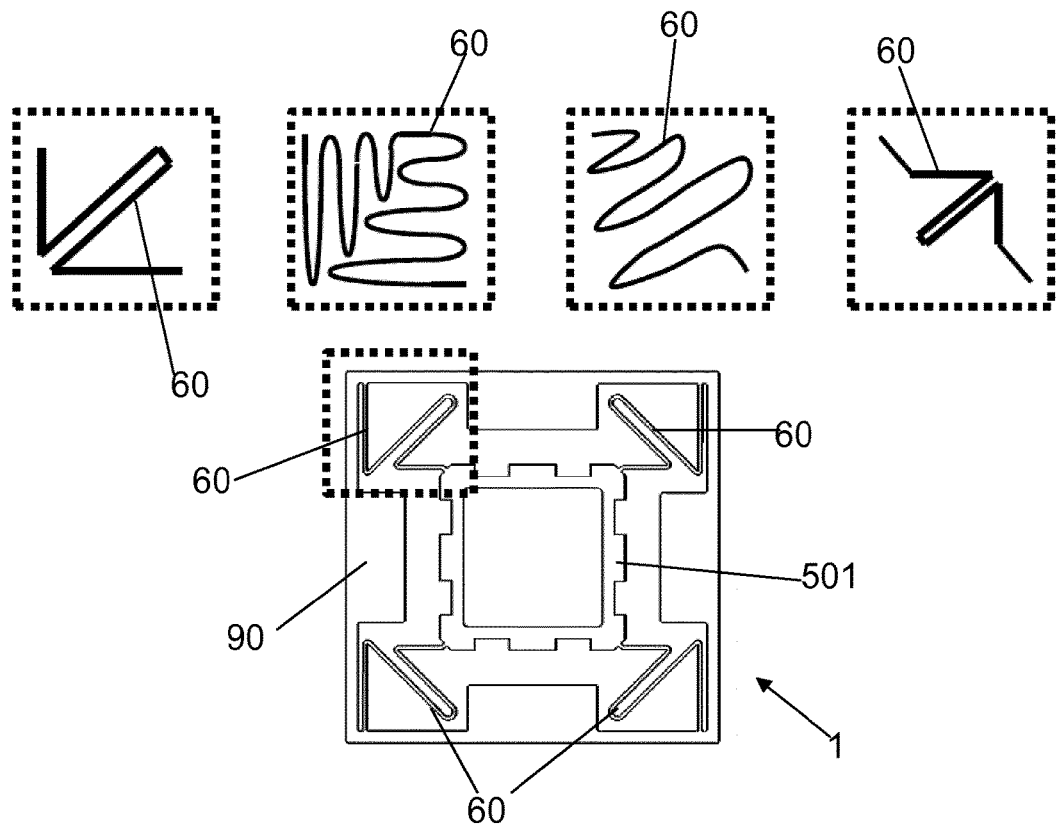
Figure 10:
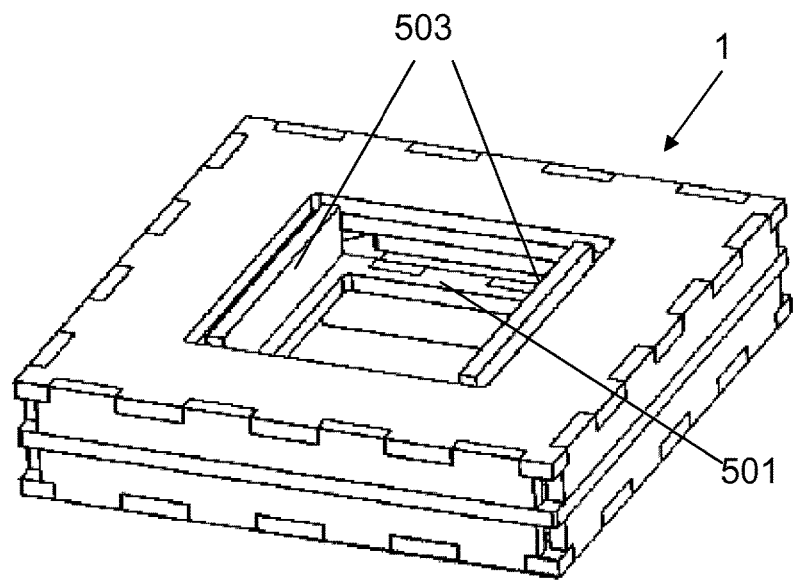

According to the embodiment shown in FIGS. 8 to 10, the reluctance actuator means 20 of the optical device 1 comprises a second magnetic flux return structure 80 extending circumferentially along said extension plane of the first optical element 10 as well as a second coil 31 comprising an electrically conducting conductor wound around a coil axis C running perpendicular to said extension plane of the first optical element 10, wherein the coil axes C of the first and the second coil 30, 31 coincide. Further, the second magnetic flux return structure 80 extends parallel to the first magnetic flux return structure 40 and faces the first magnetic flux return structure 40 along said coil axis C. Furthermore, the second coil 31 and the second magnetic flux return structure 80 surround the first magnetic flux guiding structure 50, respectively.

Further, preferably, the second magnetic flux return structure 80 surrounds the second coil 31, and the first optical element 10 is connected to the first magnetic flux guiding structure 40 via a circumferential outer edge region 10a of the first optical element 10.

For the elastic coupling, the optical device 1 comprises four spring members 60 connecting the first magnetic flux guiding structure 50 to the magnet flux return structures 40, 80, wherein particularly said spring members 60 each connect a different corner of the first magnetic flux guiding structure 50 to an associated corner of a carrier element 90 arranged between the two magnetic flux return structures 40, 80. Preferably, said spring members 60 each comprise an elongated meandering shape which may be one of the shapes shown in FIG. 9.

As shown in FIGS. 8 and 10, the first magnetic flux guiding structure 50 comprises an (e.g. rectangular) frame 501 to which said first optical element 10 is connected, wherein particularly said frame 501 comprises an upper side as well as a lower side facing away from said upper side, and wherein particularly a first and a second lower protrusion 502 protrude from the lower side of the frame 501 such that they face each other in a first direction y running parallel to said extension plane, and wherein particularly the first lower protrusion forms a first gap G with the first (lower) magnetic flux return structure 40, and wherein particularly the second lower protrusion 502 forms a parallel second gap G' with the first (lower) magnetic flux return structure 40. For initiating of a movement of the first optical element 10, the width of the first gap G is smaller than the width of the second gap G' in an initial position of the first optical element 10. Further, a first and a second upper protrusion 503 protrude from the upper side of the frame 501 such that they face each other in a second direction running perpendicular to the first direction and parallel to said extension plane, wherein particularly the first upper protrusion 503 forms a first gap G with the second (upper) magnetic flux return structure 80, and wherein particularly the second upper protrusion 503 forms a parallel second gap G' with the second (upper) magnetic flux return structure 80. Preferably, for initiating a movement of the first optical element 10 the width of the first gap G is smaller than the width of the second gap G' in an initial position of the first optical element 10. Preferably, the control circuit is further designed to apply a first current signal to the first coil 30 and a second current to the second coil 31 so that reluctance forces are generated, respectively, which move the first magnetic flux return structure 50 towards the surrounding first and second magnetic flux return structure 40, 80 in the first direction and/or in the second direction.

Figure 15:
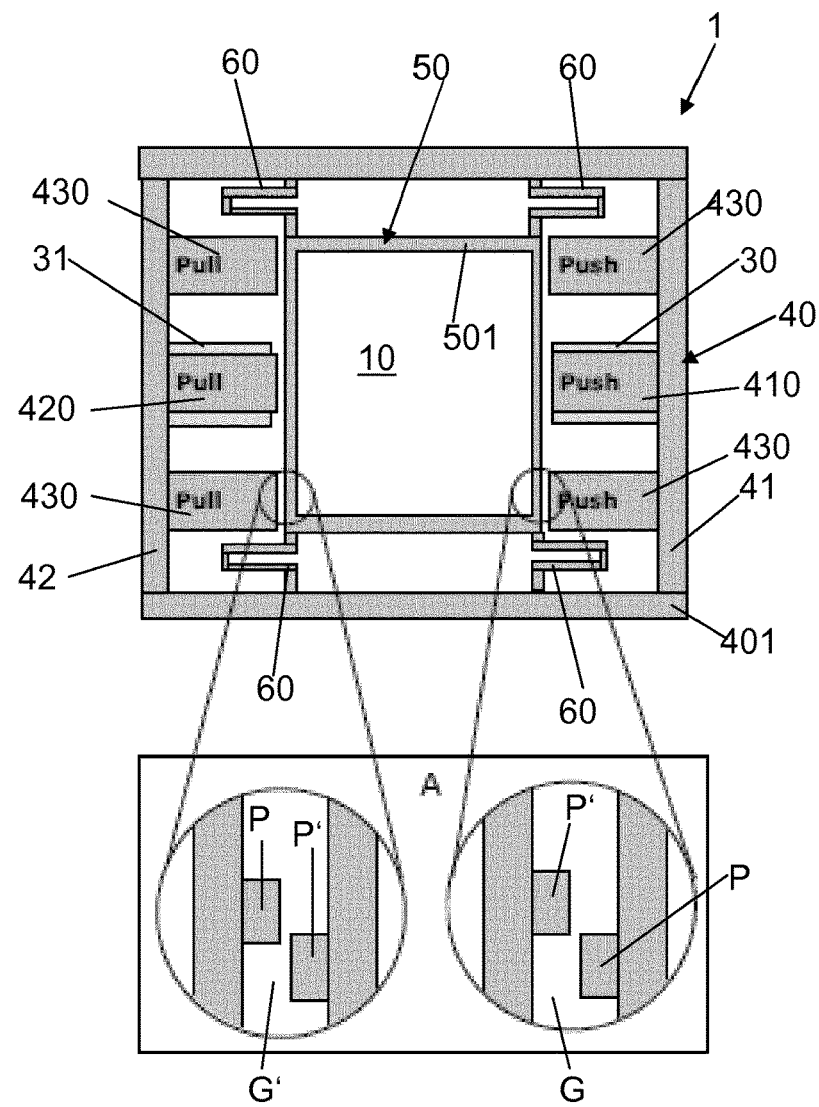
FIGS. 15-17 show different views of a further embodiment of the present invention relating to an optical device for reducing Speckle noise allowing for a linear oscillation of the first optical element, wherein two optical elements may be stacked and oscillated in perpendicular directions.
Figure 16:
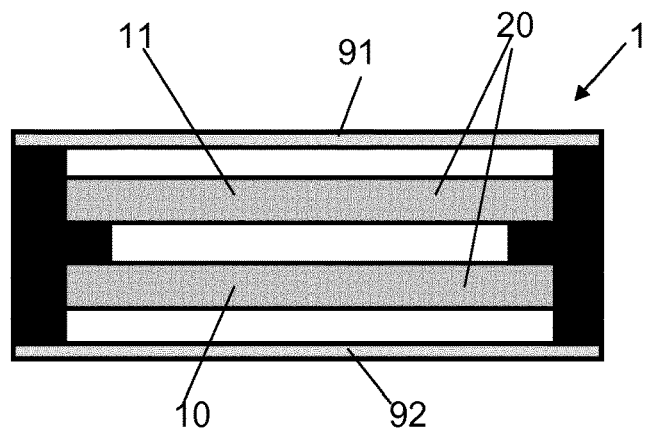
Figure 17:
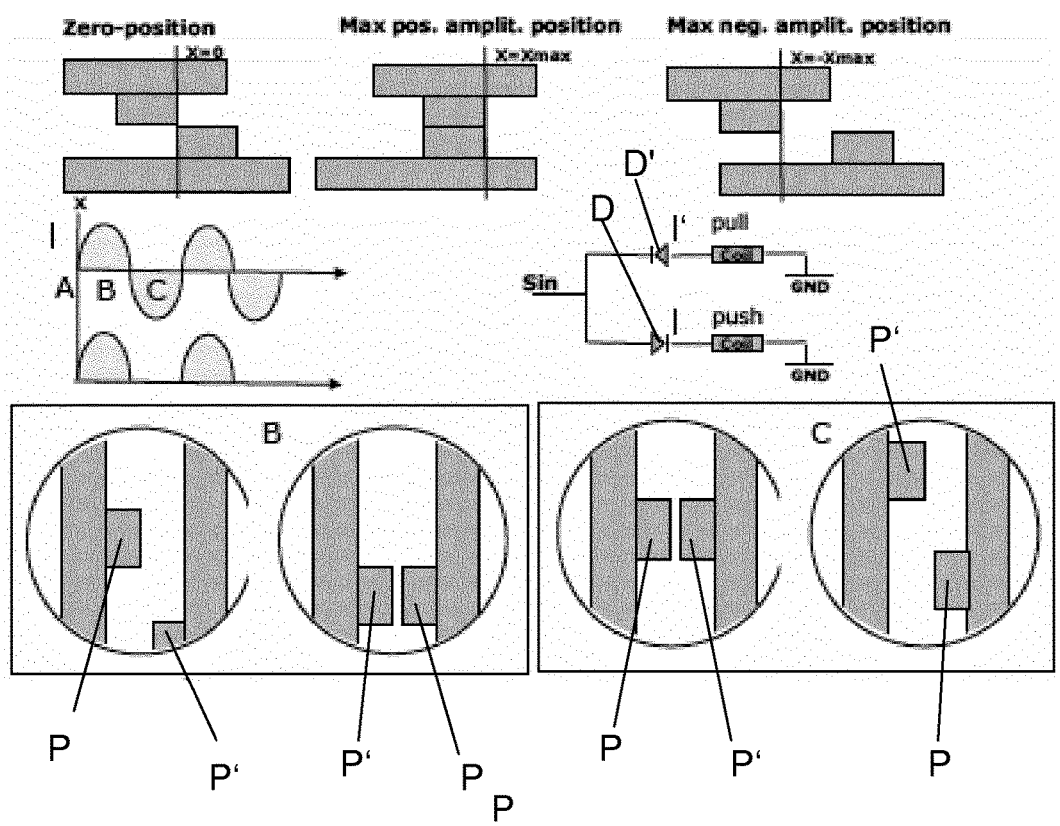

According to a further embodiment shown in FIGS. 15 to 17 the first magnetic flux return structure 50 comprises a second coil 31 opposing the first coil 30, wherein the coil axes C are aligned with each other and extend along said extension plane, and wherein the first magnetic flux return structure 40 and the first magnetic flux guiding structure 50 define said first gap G as well as a second gap G', wherein in each gap G, G' a projection P of the first magnetic flux return structure 40 is arranged offset from a projection P' of the first magnetic flux guiding structure 50, and wherein the control circuit is arranged to apply a first current I to the first coil 30 as well as second current I' to the second coil 31 such that the projections P, P' in the first gap G and in the second gap G' periodically align with each other due to a resulting reluctance force and the first magnetic flux guiding structure 50 and therewith the first optical element 10 are moved back and forth along the two opposing coils 30, 31 especially since the spring members 60 allow a movement in one direction but prevent a movement in the other direction thus preventing a snap-in of the guiding structure 50 with respect to the return structure 50 which is a severe problem in reluctance actuators.

Preferably, in detail, the first magnetic flux return structure 40 comprises a frame having a first leg 41 as well as an (e.g. parallel) second leg 42, which legs 41, 42 face each other, wherein a first protrusion 410 protrudes along said extension plane from the first leg 41 towards the second leg 42, and wherein a second protrusion 420 protrudes along said extension plane from the second leg 42 towards the first leg 41 wherein the two protrusions 410, 420 are aligned with each other, and wherein the first protrusion 410 carries said first coil 30, and wherein the second protrusion 420 carries said second coil 31. Furthermore, two lateral protrusions 430 protrude along said extension plane from the first leg 41 towards the second leg 42, and also from the second leg 42 towards the first leg 41, wherein the first protrusion 410 of the first leg 41 is arranged between the lateral protrusion 430 of the first leg 41, and wherein the second protrusion 420 of the second leg 42 is arranged between the lateral protrusions 430 of the second leg 42. Preferably, the lateral protrusions 430 of the first leg 41 are aligned with the lateral protrusions 430 of the second leg 42. Further, the first magnetic flux guiding structure 50 comprises a frame 501 to which the first optical element 10 is connected, wherein the frame 501 of the first magnetic flux guiding structure 50 is separated from the first leg 41 by the first gap G extending along the first leg 41, and wherein the frame 501 of the first magnetic flux guiding structure 50 is separated from the second leg 42 by a second gap G' extending along the second leg 42.

Further, the frame 501 of the first magnetic flux guiding structure 50 is connected via four spring members 60 to the frame 401 of the first magnetic flux return structure 40, wherein particularly said spring members 60 extend from different corners of the frame 501 of the first magnetic flux guiding structure 50 towards the frame 401 of the magnetic flux return structure 40.

As can been from FIGS. 15 and 17 in each gap G, G' a projection P of the first magnetic flux return structure 40 is arranged offset from a projection P' of the first magnetic flux guiding structure 50. In case a current I is now applied by the control circuit as shown in FIG. 17 to the first and the second coil 30, 31 (generally in such a configuration a single sinusoidal current signal may be split in two signals by the circuit indicated in FIG. 17) the projections P, P' in the first gap G and in the second gap G' periodically align with each other due to the action of a resulting reluctance force and the elastic coupling 60 which prevents a movement in the direction along the axis of the coils 30, 31. Thus, the first magnetic flux guiding structure 50 and therewith the first optical element 10 are moved back and forth along the two opposing coils 30, 31 as shown in FIGS. 15 and 17.

As further shown in FIG. 16 two reluctance actuator means 20 with movable optical elements 10, 11 may be stacked, wherein the actuator means 20 are preferably rotated with respect to each other by 90° such that the first optical element 10 can be oscillated back and forth in a first direction, while the second optical element 11 can be oscillated along the extension plane back and forth in a second direction running perpendicular to the first direction. Further this stacked configuration may be protected (e.g. against dust) with top and a bottom transparent cover elements (e.g. glass or any other transparent material) 91, 92. Further also a static diffuser may be used in this configuration. The static diffuser can be attached to one of the cover elements 91, 92, e.g. from the inside.

Furthermore, FIGS. 11, 18 to 24 show embodiments of the present invention, wherein the coil axis C of the first coil 30 runs parallel or in said extension plane along which the first optical element 10 extends.

As shown in FIGS. 18 to 24 the first magnetic flux return structure 40, the first magnetic flux guiding structure 50, and the elastic coupling 60 between the first magnetic flux guiding structure 50 and the first magnetic flux return structure 40 are formed as flat (e.g. metal) plate members extending in a in general common extension plane (further, this plane may coincide with the extension plane of the first optical element 10 that is connected to a frame of the first magnetic flux guiding structure). Preferably, the first magnetic flux return structure 40, the first magnetic flux guiding structure 50 and the elastic coupling 60 are integrally connected to each other. Further, preferably, the first magnetic flux return structure 40, the first magnetic flux guiding structure 50 and the elastic coupling 60 are made, particularly cut or stamped, from a single sheet of metal.

Preferably, the first magnetic flux return structure 40 comprises three neighboring protrusions 520, 521, 522, namely a middle protrusion 521 and two lateral protrusions 520, 522 each protruding along a first direction y from a base 530 of the first magnetic flux return structure 40, wherein said protrusions 520, 521, 522 are preferably integrally connected to said base 530, wherein said at least one first coil 31 encompasses the middle protrusion 521 such that its coil axis C runs parallel to said first direction y.

Further, preferably, the first magnetic flux guiding structure 50 extends perpendicular to said first direction y along said protrusions 520, 521, 522 such that said first gap G is formed between said protrusions and the first magnetic flux guiding structure 50.

Further, preferably, the optical device 1 comprises a carrier frame 100 formed as a flat plate member too, wherein the first magnetic flux guiding structure 50 is integrally hinged to the carrier frame 100 so that the first magnetic flux return structure 40 can be bent away from the carrier frame 100 so as to be able to arrange the first coil 31 on the middle protrusion 521.

Furthermore, preferably, the first optical element 10 is connected via a circumferential outer edge region 10a to a frame for holding the first optical element 110.

Further, preferably, the reluctance actuator means 20 is designed to pull the first magnetic flux guiding structure 50 towards the first magnetic flux return structure 40 along the first direction y (and along said common extension plane), thus reducing the width of the first gap G or to move the first magnetic flux guiding structure 50 along the first magnetic flux return structure 40 in a second direction x running perpendicular to the first direction y (and along said common extension plane).

Further, preferably, the first magnetic flux guiding structure 50 as well as the frame for holding the first optical element 110 is integrally hinged to the carrier frame 100 via said elastic coupling so that the frame for holding the first optical element 110 can be excited to oscillate along the first and/or second direction y, x by means of the control circuit and the elastic coupling, i.e., a linear oscillation as well as a two-dimensional oscillations like Lissajous figures are possible.

Figure 18:
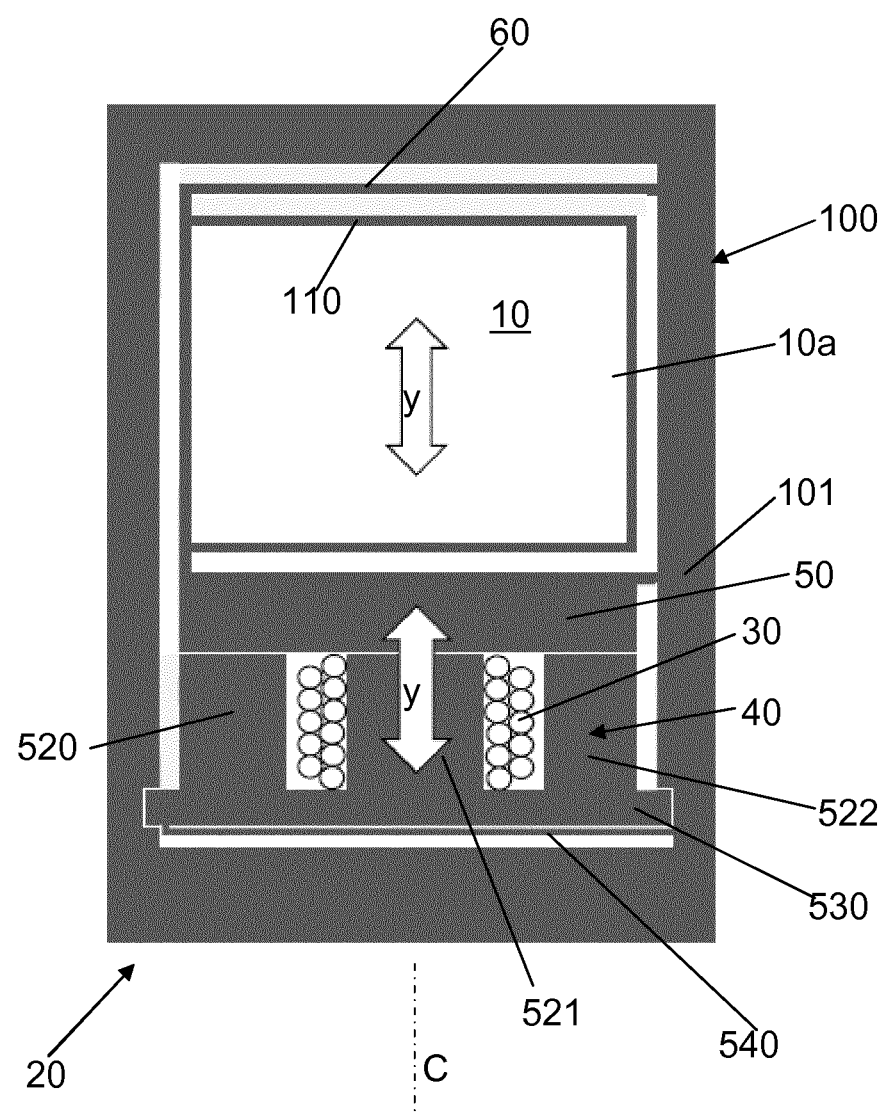
FIGS. 18-24 shows different plan views of further embodiments of the present invention where all components except for the first coil are flat and extend along a common extension plane and are integrally connected to each other (however, also multiple components may be used that are soldered together)

As shown in FIG. 18 the first magnetic flux guiding structure 50 is hinged (elastic coupling) with a first end to an adjacent first leg 101 of the carrier frame 100 and is further integrally connected with its other second end to the frame for holding the first optical element 110, which in turn is hinged via a linear spring (elastic coupling) 60 to said first leg 101 of the carrier frame 100 so that the first optical element 10 can pivot back and forth along the first direction y about the two integral hinges.

Further, the first magnetic flux return structure 50 is hinged via an elongated member to the carrier frame 100, so that the return structure can be bent away from the carrier frame 100 for installing the first coil 30.

Figure 19:
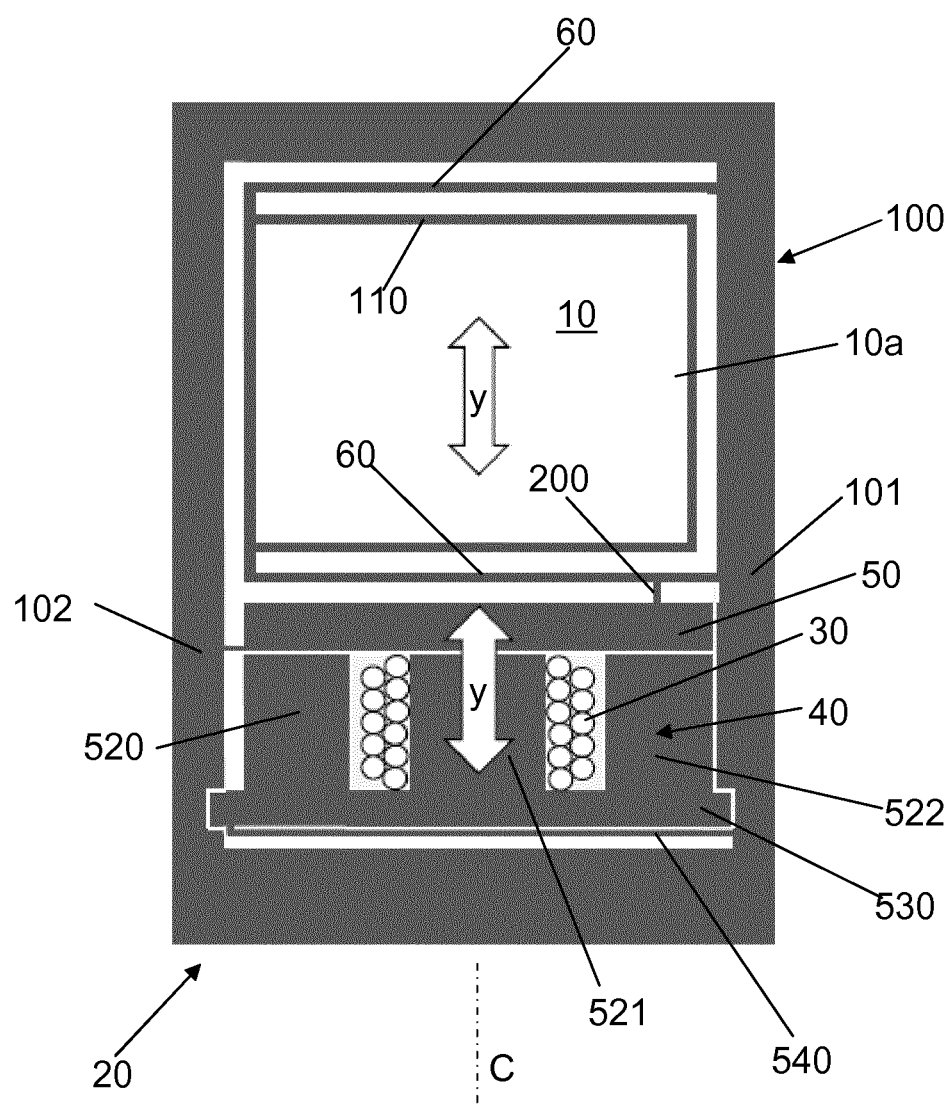

As shown in FIG. 19 the frame for holding the first optical element 110 is now hinged—in contrast to FIG. 18—via two linear springs (elastic coupling) 60 to said first leg 101 of the carrier frame 100, wherein the first magnetic flux guiding structure 50 is now hinged with its second end to a second leg 102 of the carrier frame 100 facing said first leg 101 and running parallel to said first leg 101. For driving the first optical element 10, the first magnetic flux guiding structure 50 is now integrally connected at its first end via a stripe-shaped connection member 200 extending in the first direction y so that a considerably larger lever results and a larger amplitude of the oscillation of the first optical element 10.

Figure 20:
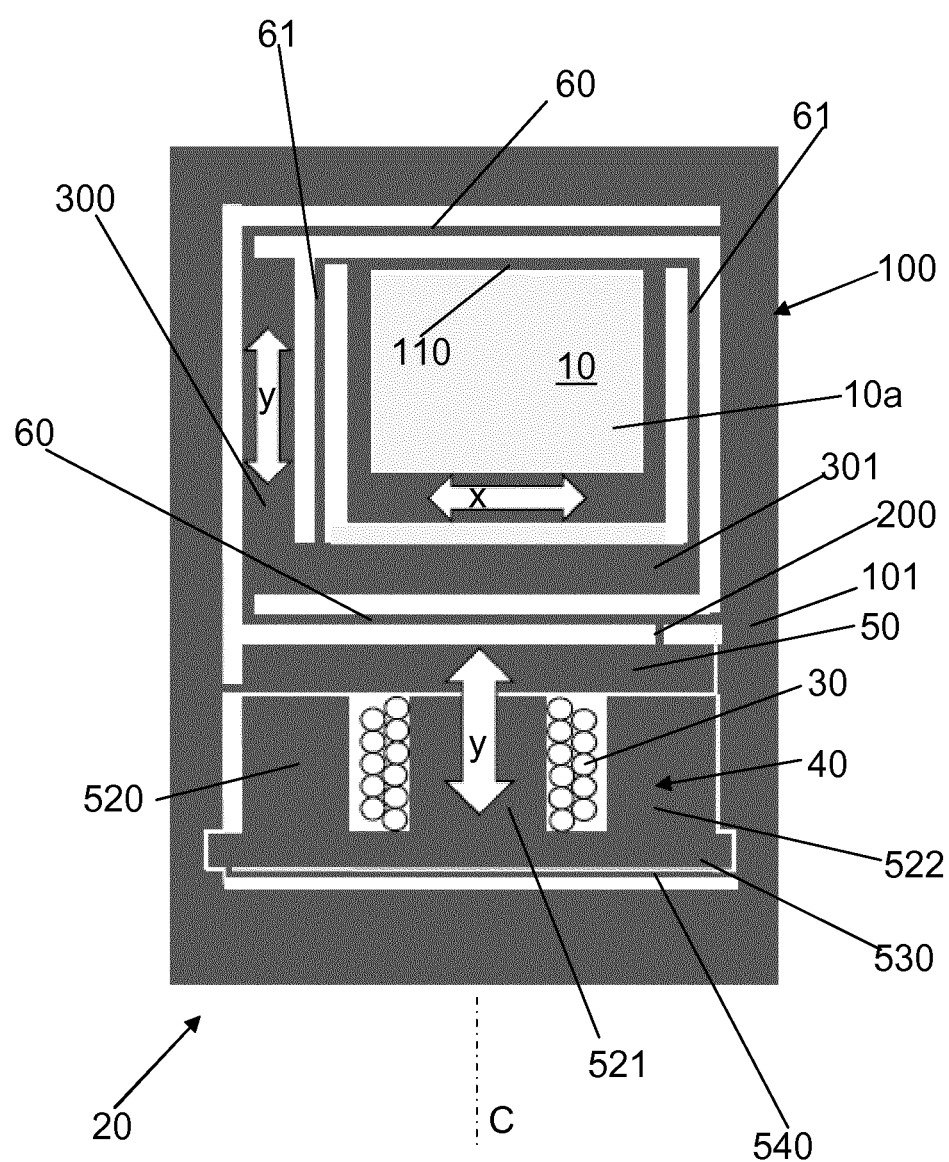

FIG. 20 shows a modification that allows for exciting two-dimensional oscillations of the first optical element 10. Here, in contrast to FIG. 19, an L-shaped member 300 is hinged via the two linear springs 60 to the first leg 101, while the frame for holding the first optical element 110 is hinged via two linear springs 61 to the limb 301 of the L-shaped member that extends perpendicular to the first direction y, namely along the second direction x. Since the oscillation in the first direction y is actually a pivoting movement, it also comprises a component in the second direction x, which excites an oscillation of the first optical element 10 also in the second direction x. Thus, when the eigenfrequencies are properly matched, the first optical element 10 can be excited to perform two-dimensional motion.

Figure 21:
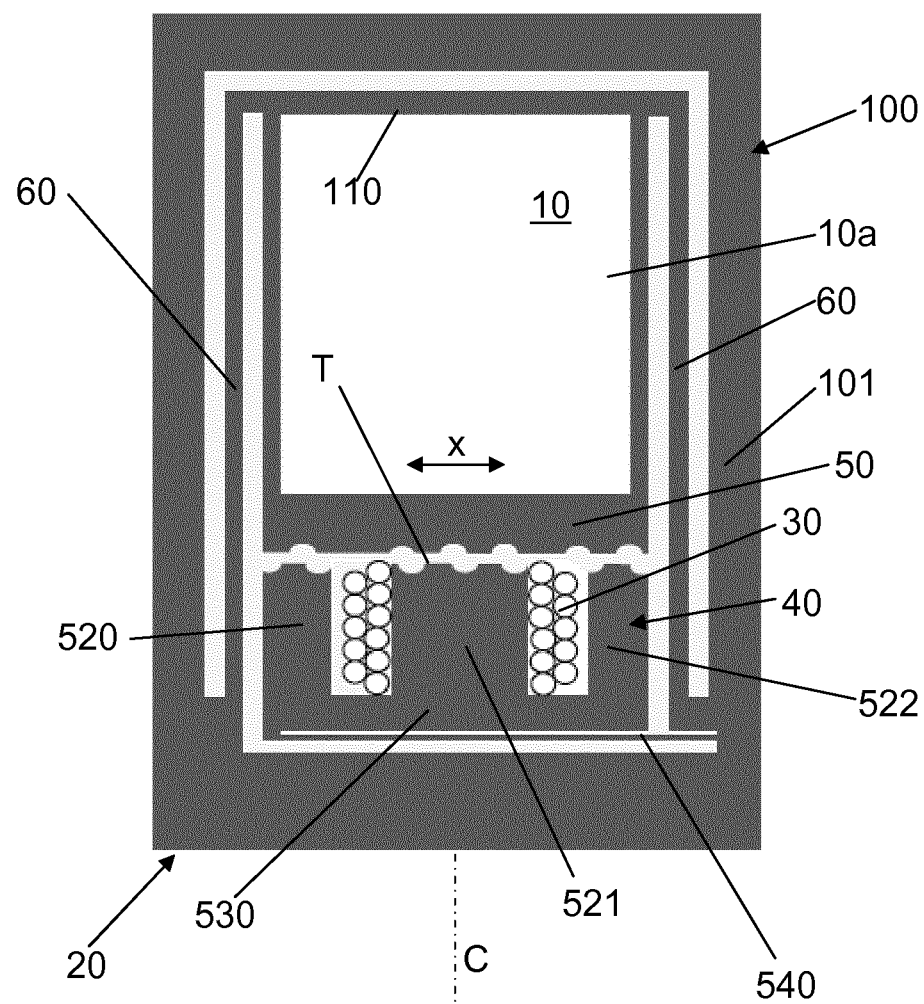
Figure 23:
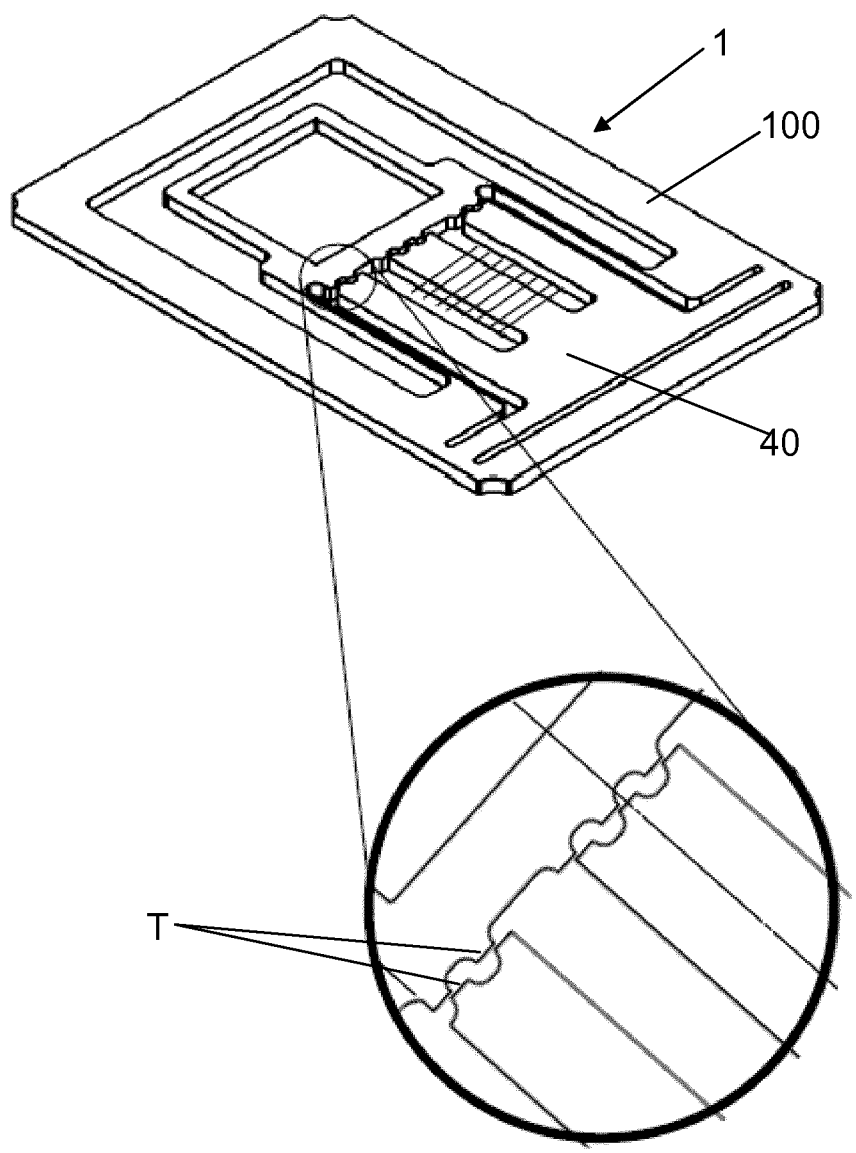

According to FIG. 21 the first magnetic flux return structure 40 is designed to oscillate along the second direction x, since the two guiding structures 40, 50 comprise teeth T arranged offset along the second direction x. Here, the resultant reluctance force tries to align the teeth T thus generating an oscillation along the second direction x when the current for the first coil 30 is correspondingly controlled. Restoring forces are provided by the two linear springs 60 by means of which the frame for holding the first optical element 110 is hinged to the carrier frame 100. The springs 60 also prevent an attraction of the flux return structure 40 and the flux guiding structure 50, preventing a snap-in effect. FIG. 23 shows a further variant of this embodiment where the first magnetic flux return structure 40 is hinged on both sides to the carrier frame 100 for bending the return structure 40 out of the common extension plane (e.g. for mounting a first coil 30).

Figure 22:
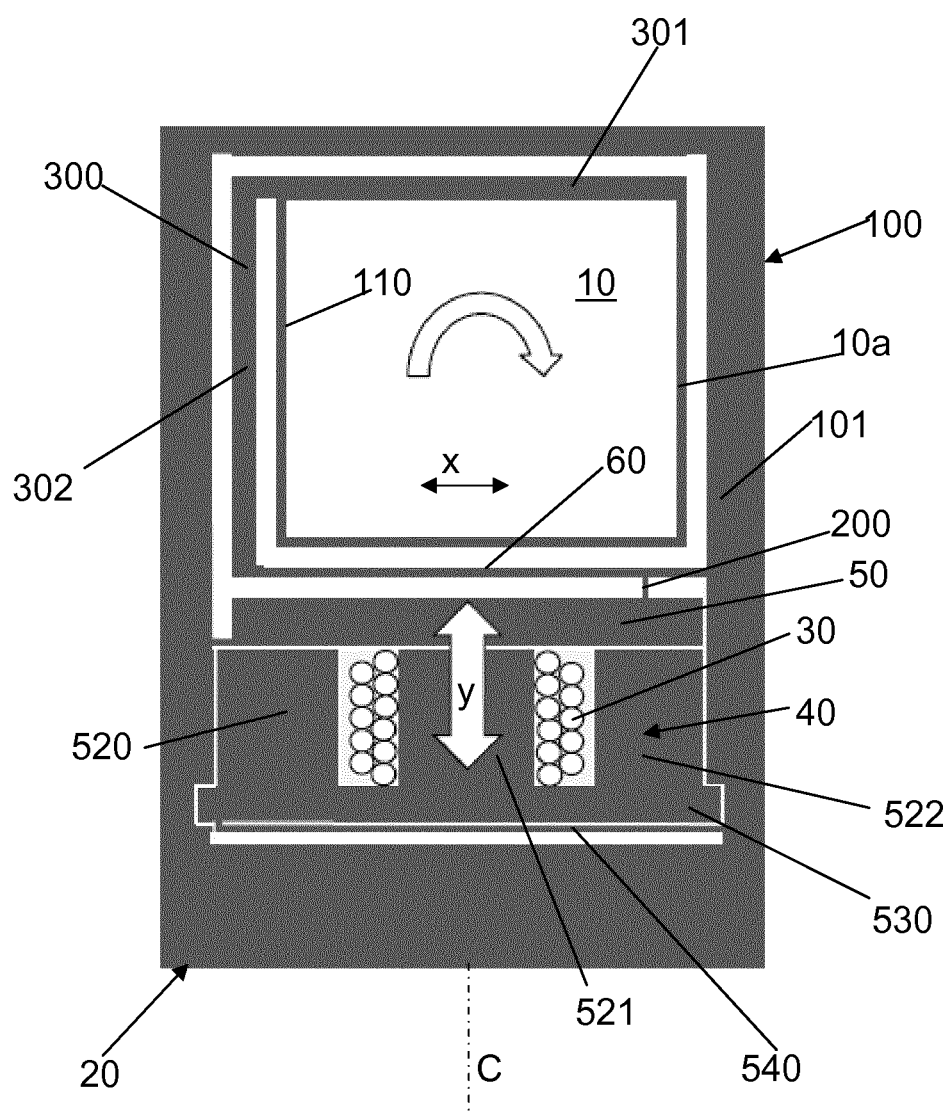

FIG. 22 shows a further variant where—in contrast to FIG. 19—the frame for holding the first optical element 110 is hinged such that it can perform oscillation in the first and in the second direction y, x resulting in an e.g. circular movement of the first optical element 10. Here, the frame for holding the first optical element 110 is hinged to a limb 301 of an L-shaped member 300, which limb 301 extends along the second direction x, while the other limb 302 extends along the first direction y and is integrally connected to the first magnetic guiding structure 50 via an elongated member 60 that is integrally hinged to the first leg 101 and integrally connected via said connection member 200 to the first magnetic flux guiding structure 50.

Figure 24:
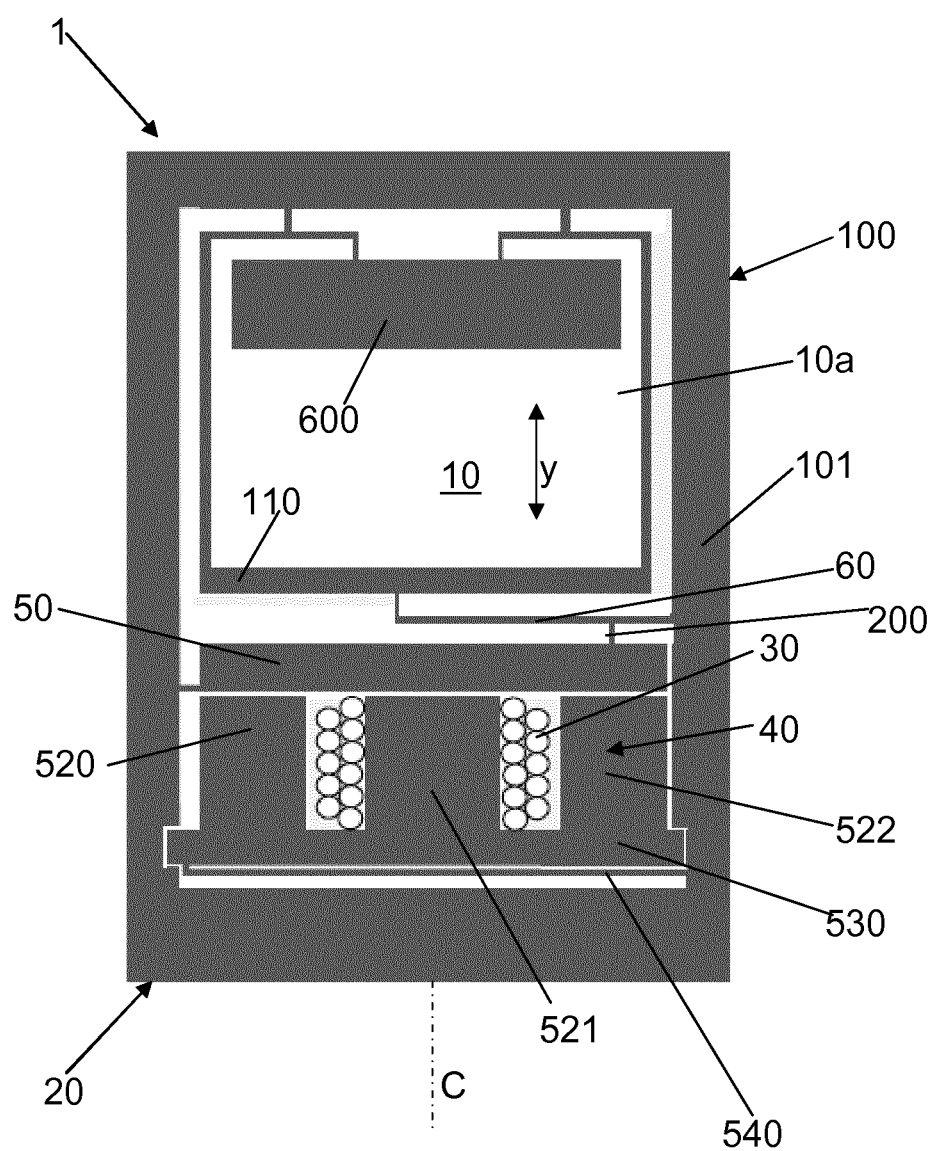

Further, FIG. 24 shows an example for the compensation of an overall oscillation of the optical device 1. Here, the balancing mass 600 oscillates inversely phased to the oscillations of the first optical element 10 along the first direction y. This can also be employed in case of two-dimensional oscillations along the extension plane where two balancing masses may be used.

Figure 11:
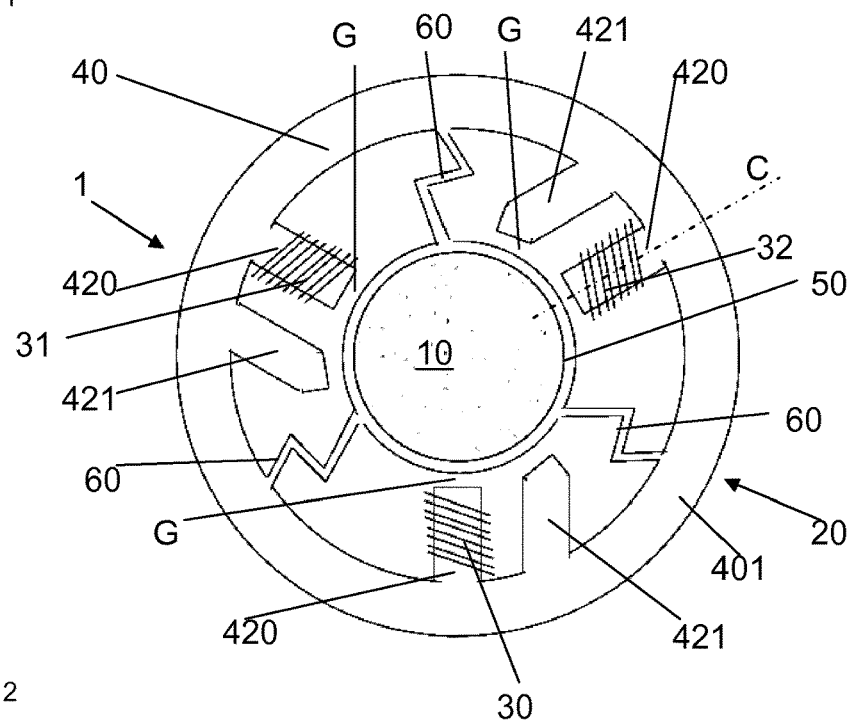
FIG. 11 shows a plan view onto a further embodiment of the present invention relating to a planar optical device for reducing Speckle noise having three coils allowing for a 2D oscillation of the first optical element.

Further, according to the embodiment shown in FIG. 11 the first magnetic flux return structure 40 comprises an annular (e.g. circular) frame 401, wherein said first coil 30, as well as a second coil 31 and a third coil 32 (which are formed like the first coil) of the reluctance actuator means 20 are each wound around an associated first protrusion 420, wherein particularly said first protrusions 420 each protrude inwardly from said frame 401 (e.g. towards a center of the frame 401 or towards a central region inside the frame), such that the coil axes C extend along said extension plane, and wherein particularly a second protrusion 421 protrudes inwardly from said frame 401 adjacent to each first protrusion 420. Further, preferably, the first magnetic flux guiding structure 50 comprises an annular (e.g. circular) shape and is particularly connected via three spring members 60 to the frame 401 of the first magnetic flux return structure 40, and wherein particularly each pair of a first and an adjacent second protrusion 420, 421 forms a gap G with the first magnetic flux guiding structure 50.

Preferably, the control circuit is designed to apply a current to each coil 30, 31, 32 so that the first magnetic flux return structure 40 and therewith the first optical element 10 performs a periodic two-dimensional movement along said extension plane. Further, preferably, adjacent spring members 60 are arranged at 120° with respect to each other.

Figure 25:
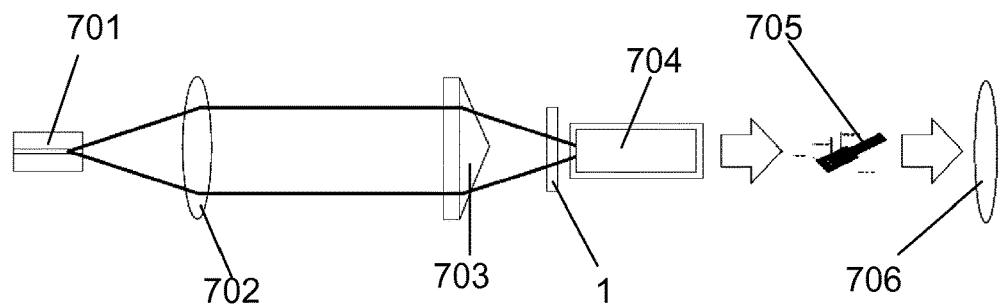
FIGS. 25-28 shows schematical views of various applications of the optical device for reducing Speckle noise according to the invention.

FIG. 25 shows the use of an optical device 1 according to the invention to reduce speckle noise in a lower power projector such as a laser TV comprising a fiber 701, a collimation optics 702, an axicon 703, a beam homogenizer 704, an optical device 1 according to the invention arranged between the axicon 703 and the beam homogenizer 704, and a micro display such as DLP (digital light processing) or LCOS (Liquid Crystal on Silicon) 705 as well as a projection optics 706. To achieve a good speckle reduction, it is important that the optical device 1 is placed close to the beam homogenizer 704 and is fully illuminated.

Figure 26:
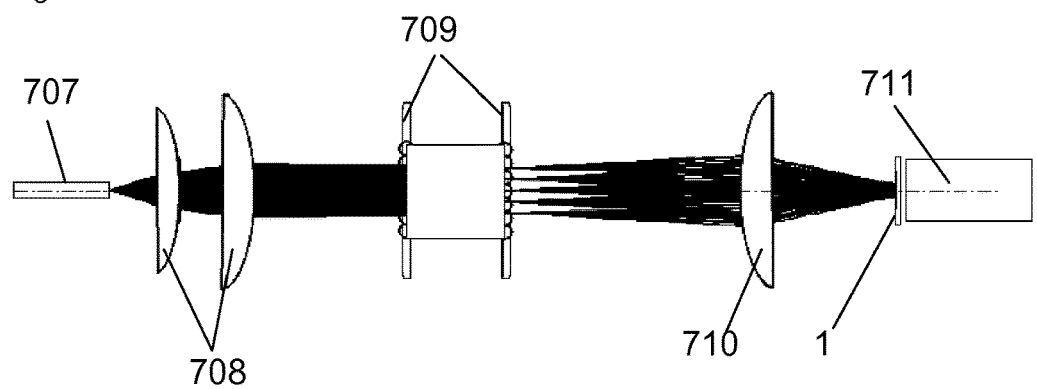

FIG. 26 shows the application of an optical device 1 according to the invention in a high power projector such as a cinema projector, comprising an optical fiber 707, a collimation optics 708, a Fly' eye lens pair 709, and a focusing lens 710, where the optical device 1 is arranged before the homogenizer rod 711.

Figure 27:
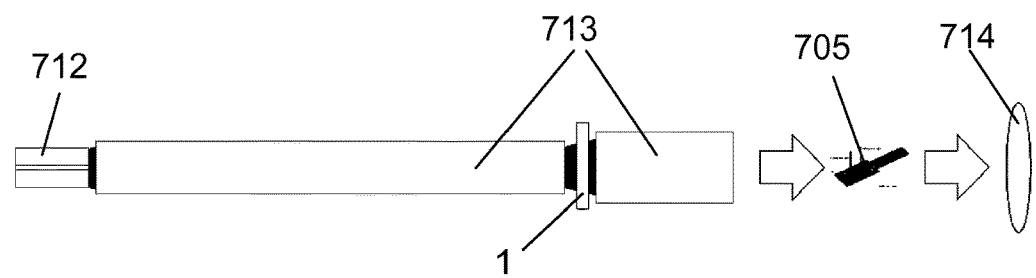

Likewise, in FIG. 27 the optical device 1 according to the invention is arranged between two Integrator rods/beam homogenizers 713. The configuration further comprises a fiber 712 a DLP/LCOS 705 and a projection optics 714.

Figure 28:
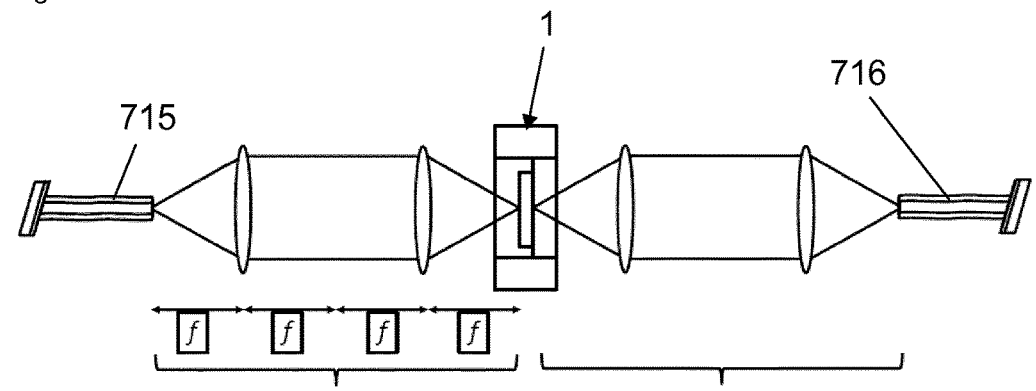

FIG. 28 shows the application of the optical device 1 according to the invention in fiber coupling between a laser source fiber 715 and a multimode fiber 716, wherein before and after the optical device 1 a so called 4-f imaging is provided.

Figure 29:
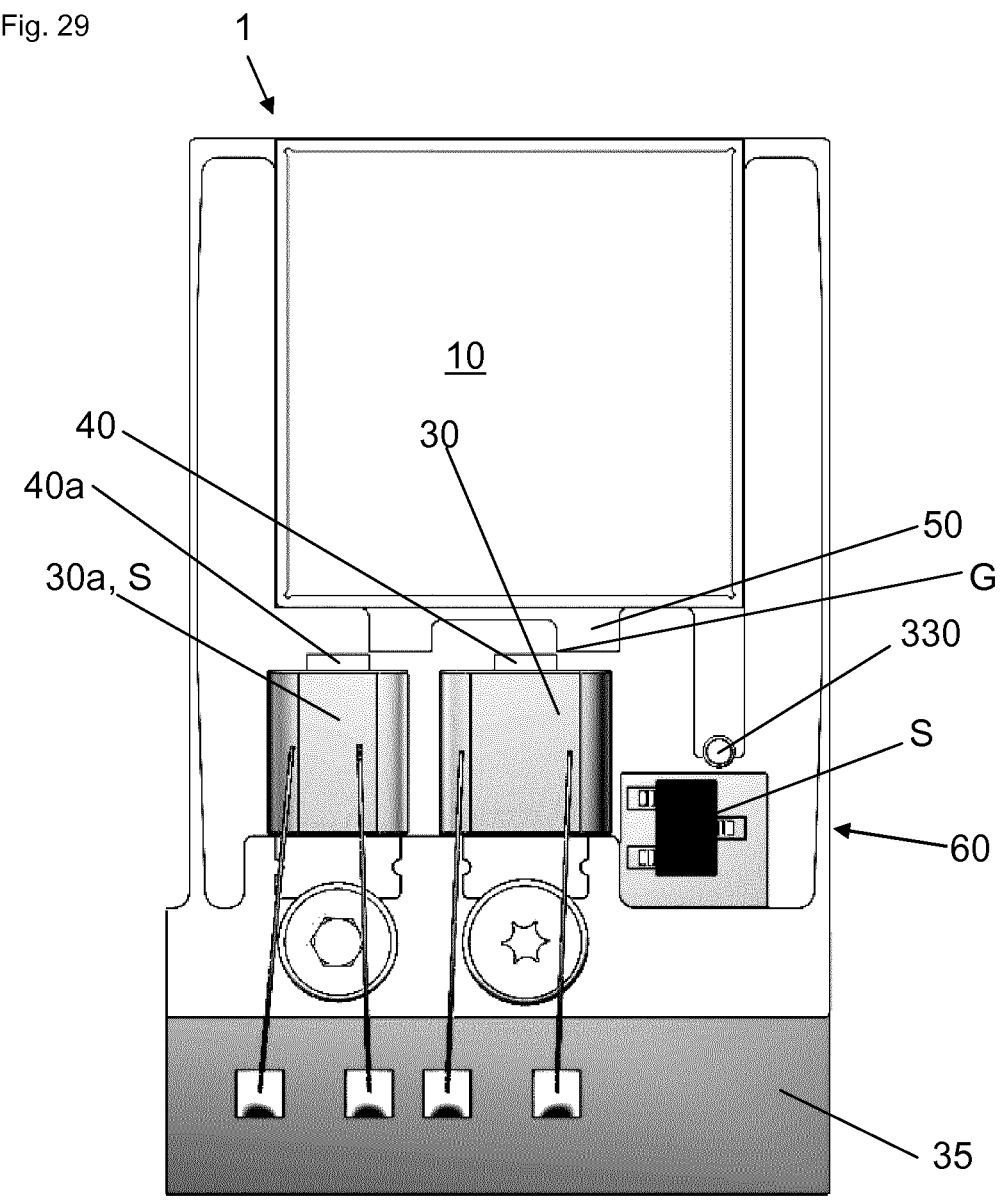
FIG. 29 shows a schematical view of an embodiment of the present invention with a sensor for sensing the amplitude or amplitude gain of the movement of the first optical element.

Further, FIG. 29 shows a general example for arranging a sensor S on the optical device 1. Such a sensor S may also be provided in all other embodiments shown or described in this application. Also here, the optical device 1 for reducing Speckle noise of laser light, comprises the first optical element 10 extending along an extension plane, wherein the actuator means 20 designed for moving or stretching said first optical element 10 along said extension plane, wherein said actuator means 20 is formed as a reluctance actuator means that is designed to exert a reluctance force on the first optical element 10 to move or stretch the first optical element 10 along said extension plane. The reluctance actuator means 20 comprises a first electrically conducting coil 30, a first magnetic flux return structure 40 being arranged adjacent to said first coil 30, and a first magnetic flux guiding structure 50 connected to the first optical element 10, wherein said first magnetic flux guiding structure 50 is particularly separated from said first magnetic flux return structure 40 by a first gap G, and wherein the optical device 1 is designed to apply a current I to said first coil 30 such that magnetic flux generated by the first coil 30 is guided by the first magnetic flux return structure 40 and the first magnetic flux guiding structure 50 particularly via said first gap G and a resulting reluctance force moves the first magnetic flux guiding structure 50 and therewith the first optical element 10 with respect to the first magnetic flux return structure 40 along said extension plane.

Further, the optical device 1 comprises a control circuit, e.g. arranged on a PCB 35 that comprises an electrical energy source designed to apply an electrical current I to the at least one first coil 30 of the reluctance actuator means 20 having a tunable frequency, wherein said control circuit is designed to control said frequency of the current applied to the at least one first coil such that a maximal amplitude or amplitude gain of the movement of the first optical element is 10 achieved. For sensing/determining the actual amplitude or amplitude gain, the device 1 comprises a sensor S connected to the control circuit.

For instance, this sensor S may be a Hall sensor that senses the magnetic field of a magnet 330 that moves with the first optical element 10. Here the Hall sensor S can be e.g. placed below the magnet 330 as shown in FIG. 29.

The device 1 shown in FIG. 29 also shows an alternative sensor S on the left hand side which may be used instead of the Hall Sensor S shown on the right hand side.

Here, the device 1/sensor S comprises a (further) coil 30a by means of which the magnetic flux between the first magnetic flux guiding structure 50 to a part 40a of the first magnetic flux return structure 40, which part 40a is enclosed by the further coil 30a can be measured.

The respective sensor S or the control circuit (e.g. on PCB 35) may be configured to determine the amplitude or amplitude gain of the vibration of the first optical element 10 by using the measured magnetic field or magnetic flux (see above). The control circuit then particularly changes the frequency of the current applied to the at least one first coil 30 such that the measured amplitude or amplitude gain approaches a maximal value, respectively.

Figure 30:
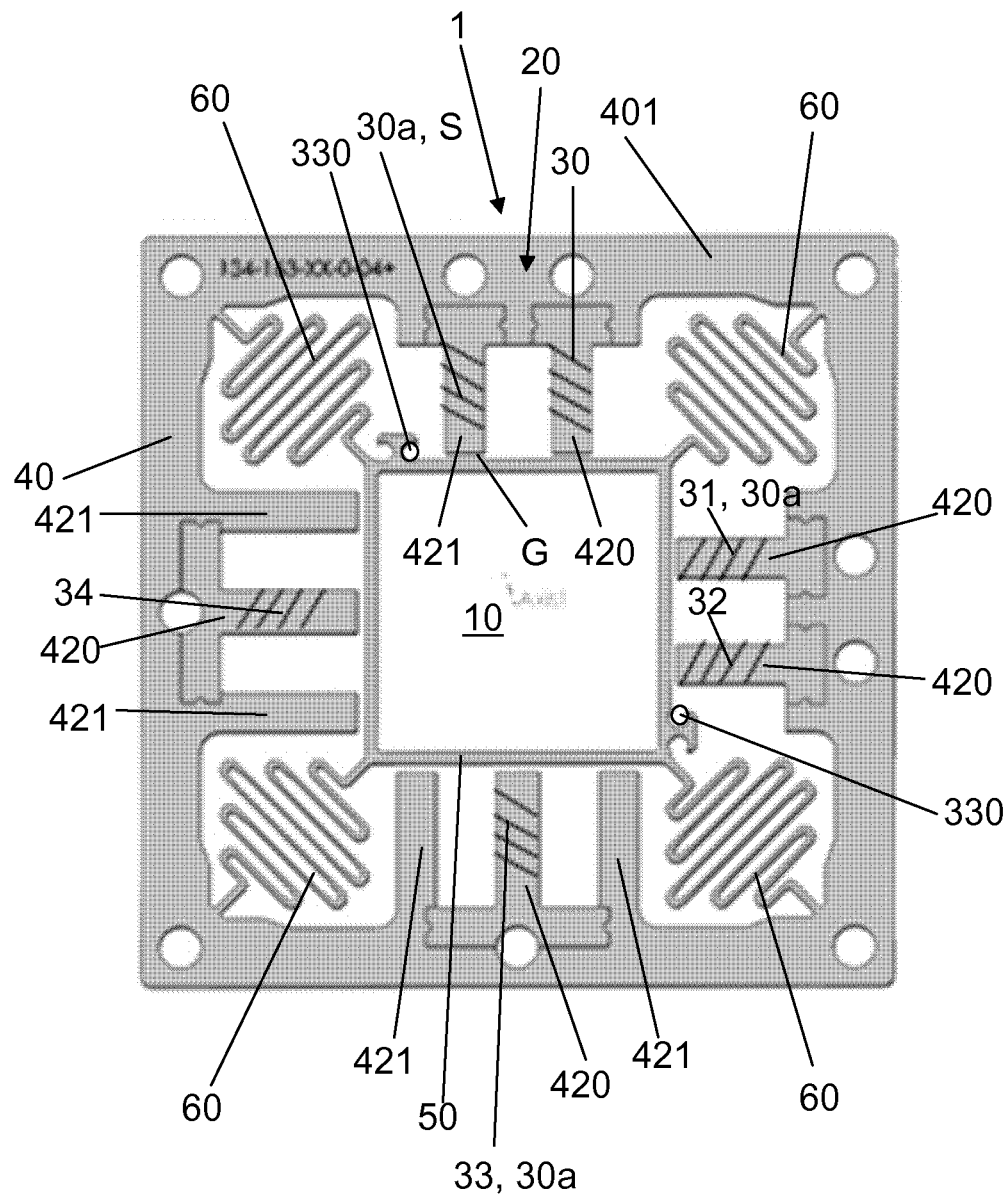
FIGS. 30-32 show schematical views of a further embodiments according to the invention comprising frames.
Figure 31:
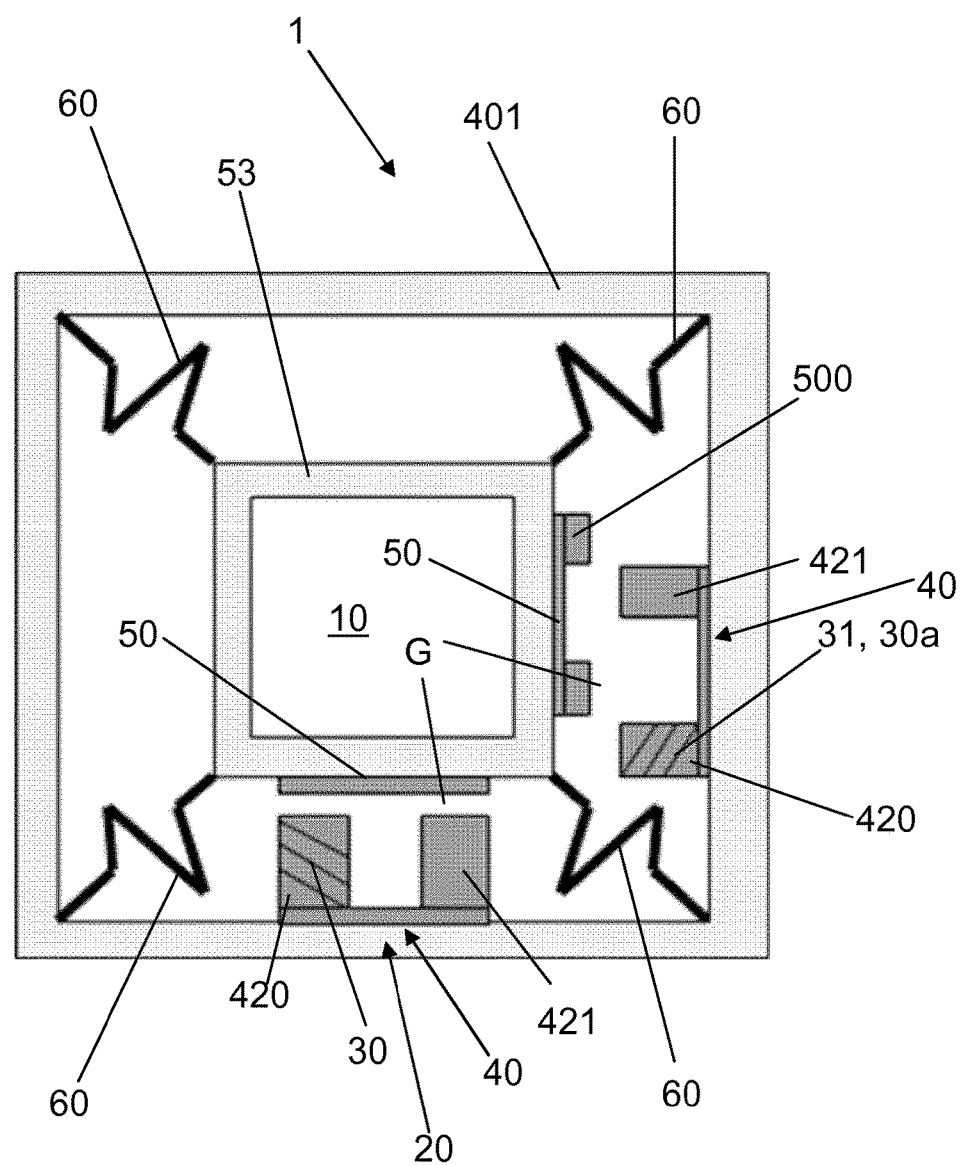
Figure 32:
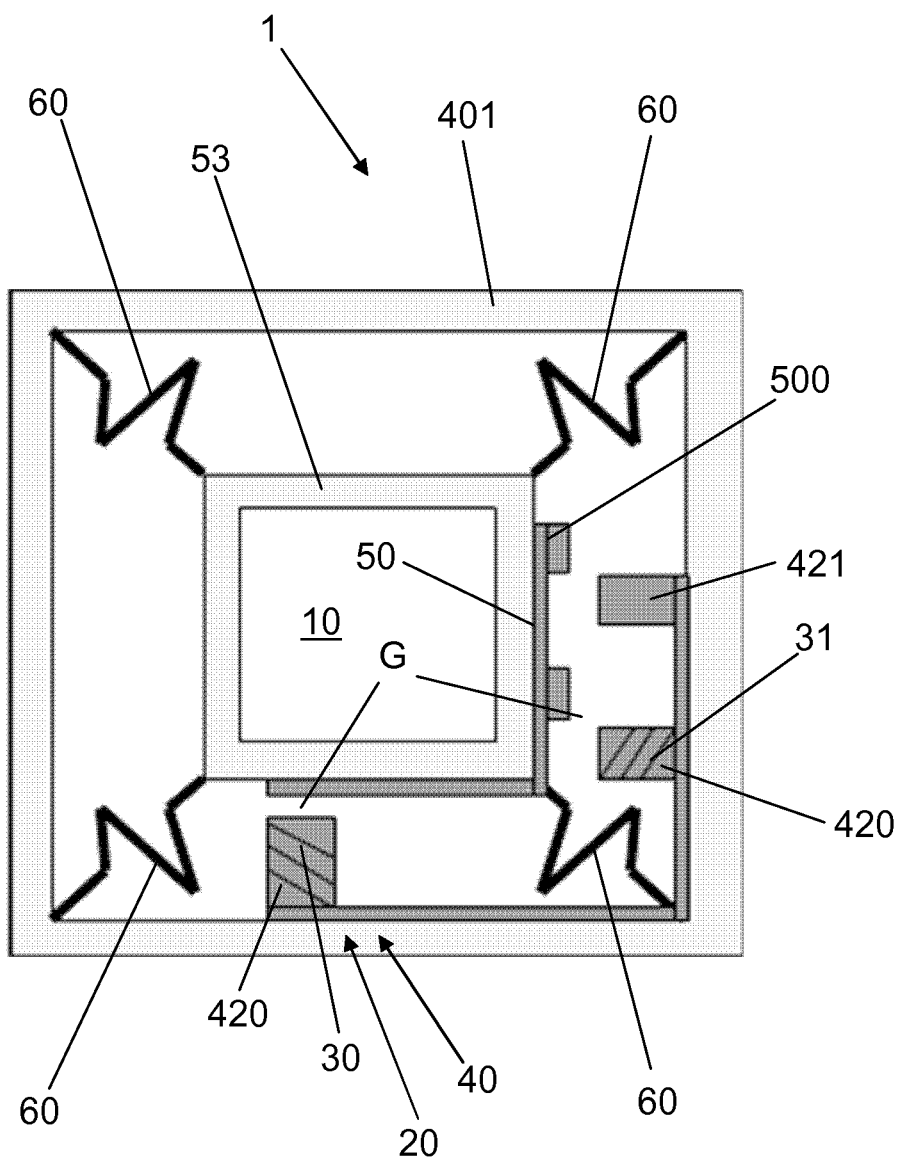

FIGS. 30 to 32 show further embodiments of an optical device 1 according to the invention for reducing Speckle noise of laser light, where the sensor S, as described before, uses at least one coil 30a for measuring the position of the first optical element 10 (generally in FIGS. 30 to 32 every coil can be used to measure the position of the first optical element 10), particularly via a magnet 330 connected to the first optical element 10. In detail, according to FIG. 30, the optical device 1 comprises said first optical element 10 that may be designed as described above as well as an actuator means 20 designed for moving said first optical element 10 along an extension plane along which the first optical element 10 extends. Again, the actuator means 20 is formed as a reluctance actuator means that is designed to exert a reluctance force on the first optical element 10 to move the first optical element 10 along said extension plane.

For this, the reluctance actuator means 20 comprises several electrically conducting coils 30 to 35, a first magnetic flux return structure 40 being arranged adjacent to said coils 30 to 35, and a first magnetic flux guiding structure 50 connected to the first optical element 10, wherein the first magnetic flux guiding structure 50 forms a rectangular frame for the first optical element 10, which is separated from said first magnetic flux return structure 40 by a gap G (see below).

In detail, in FIG. 30, the first magnetic flux return structure 40 comprises a rectangular frame 401 surrounding the first optical element 10 and said first magnetic flux guiding structure 50, which is connected by means of e.g. four spring members 60, which can be configured as described above, to the frame 401, wherein particularly each spring member 30 extends from a corner region of the first magnetic flux guiding structure 50 to a corner region of the surrounding frame 401.

In FIG. 30, the frame 401 is made out of a magnetically soft material (see above) and comprises two adjacent sides (connected via a corner region of the frame 401), wherein a first protrusion 420 and a second protrusion 421 of the frame 401 protrude from each of these sides inwardly towards the first magnetic flux guiding structure 50 where they are separated from the latter by said gap G. The protrusions 420, 421 form part of the magnetic flux return structure 40. A coil 30a, 30, 31, 32 is wound around or arranged on each of these protrusions 420, 421. The frame 401 comprises two remaining adjacent sides which form the frame 401 together with the afore-mentioned adjacent sides, wherein from each of these two remaining adjacent sides only one first protrusion 420 protrudes inwardly towards the first magnetic flux guiding structure 50, wherein each of these protrusions 420 is arranged between two second protrusions 421 protruding inwardly from the respective side of the frame 401. The protrusions 420, 421 form part of the magnetic flux return structure 40. Here, a coil 33, 34 is wound or arranged on the first protrusions 420, respectively, wherein the second protrusions 421 do not carry coils. Also, the protrusions 420, 421 protruding from said remaining sides of the frame 401 form said gap G with the first magnetic flux guiding structure 50. Here, all protrusions 420, 421 (as well as the first magnetic flux guiding structure 50) are also formed out of a magnetically soft material.

One of the coils, e.g. coil 30a, can be part of a sensor S for detecting the position of the first optical element 10, as described above. At least one, some or all of the other coils 30 to 34 may be used for moving the first optical element 10. For this, the optical device 1 (e.g. control circuit, see above) is designed to apply a current I to at least one of the coils 30 to 34 such that magnetic flux generated by the respective coil is guided by the first magnetic flux return structure 40 and the first magnetic flux guiding structure 50 and a resulting reluctance force moves the first magnetic flux guiding structure 50 and therewith the first optical element 10 with respect to the first magnetic flux return structure 40 along said extension plane. In detail, in FIG. 30, the first optical element 10 can be moved towards the respective coil 30 to 35 by the reluctance actuator 20 thus reducing the respective gap G.

FIG. 31 shows a variant of the embodiment shown in FIG. 30, wherein now the frame 401 of the optical device 1 is made out of a non-magnetically soft material (i.e. a material that is not magnetically soft) and does not form a part the magnetic flux return structure 40. Further, in contrast to FIG. 30 there are particularly only two adjacent sides of the frame 401 comprising protrusions 420, 421. Here, a first protrusion 420 and a second protrusion 421 protrude from each of these sides inwardly towards an associated, separate magnetic flux guiding structure 50.

While the frame 401 as well as an e.g. rectangular frame 53 of the first optical element 10 that is surrounded by said frame 401 are formed out of a non-magnetically soft material, the protrusions 420, 421 and the magnetic flux guiding structures 50 are formed out of a magnetically soft material. Further, the protrusions 420, 421 of each side of the frame 401 are connected to each other by a magnetically soft material, whereas protrusions 420, 421 from one adjacent side are not connected to protrusions 420, 421 of the other adjacent side by a magnetically soft material. Here, the protrusions 420, 421 of each adjacent side of the frame 401 form part of a separate magnetic flux return structure 40.

In detail, on a first side of the frame 401, the first and the second protrusion 420, 421 are connected by a magnetically soft material and form a gap G with the associated magnetic flux guiding structure 50 that is connected to the frame 53 of the first optical element 10 and faces said protrusions 420, 421. Particularly, a coil 30 is wound or arranged on the first protrusion 420 protruding from said first side of the frame 401, wherein the neighboring second protrusion 421 does not carry a coil.

On a second side of the frame 401 adjacent to the first side, the protrusions 420, 421 are configured like the protrusions 420, 421 on said first side of the frame 401 (protrusion 420 has a coil 31), but now the protrusions 420, 421 are arranged offset relative to two associated smaller protrusions 500 of the respective magnetic flux guiding structures 50 that face the protrusions 420, 421 of the second side of the frame 401 and form a gap G with them. Due to this configuration, the first optical element 10 can be actuated by the reluctance actuator 20 such that the gap G on the second side of the frame 401 closes laterally or horizontally (i.e. element 10 moves laterally along and/or towards the protrusions 420, 421 of the second side of the frame). The position of the first optical element 10 can be measured with one of the coils (e.g. coil 30a) or be using a magnet and coil (e.g. sensor S).

Finally, FIG. 32 shows a variant of the embodiment of FIG. 31, wherein, in contrast to FIG. 31, there is only a single first protrusion 421 having a coil 30 on the first side of the frame 401, which is connected to the protrusions 420, 421 of the second side of the frame 401 by a magnetically soft material. Further, in contrast to FIG. 31, the separate magnetic flux guiding structures 50 of FIG. 31 are now connected by a magnetically soft material, i.e., form a single magnetic flux guiding structure 50 extending along two adjacent sides of the frame 53 of the first optical element 10. Due to this configuration, the first optical element 10 can be actuated by the reluctance actuator 20 such that the gap G on the second side of the frame 401 closes laterally or horizontally (i.e. element 10 moves laterally along and/or towards the protrusions 420, 421 of the second side of the frame 401). The position of the first optical element 10 can be measured with one of the coils 30, 31 or be using a magnet and coil (e.g. sensor S).

Of course all other sensors described above may also be integrated into an optical device 1 (e.g. on the PCB 35) according to the invention as shown in one of the Figures.

The invention claimed is:

1. An optical device configured to reduce speckle noise of laser light, said device comprising:
   a first optical element extending along an extension plane,
   reluctance actuator designed to move or stretch said first optical element along said extension plane,
   wherein said reluctance actuator is designed to exert a reluctance force on the first optical element to move or stretch the first optical element along said extension plane, wherein the reluctance actuator comprises a first electrically conducting coil, a first magnetic flux return structure being arranged adjacent to said first coil, and a first magnetic flux guiding structure being connected to the first optical element and separated from said first magnetic flux return structure by a first gap, and wherein the optical device being designed to apply a current to said first electrically conducting coil such that magnetic flux generated by the first electrically conducting coil is guided by the first magnetic flux return structure and the first magnetic flux guiding structure via said first gap (G) and a resulting reluctance force moves the first magnetic flux guiding structure and therewith the first optical element with respect to the first magnetic flux return structure along said extension plane.

2. An optical device configured to reduce speckle noise of laser light comprising:
   a first optical element extending along an extension plane;
   a reluctance actuator designed to move or stretch said first optical element along said extension plane;
   wherein said reluctance actuator is designed to exert a reluctance force on the first optical element to move or stretch the first optical element along said extension plane; and
   wherein the first magnetic flux return structure or the optical device comprises a frame, wherein the frame comprises or is made out of a magnetically soft material or a non-magnetically soft material, wherein said first coil of the reluctance actuator is wound around or arranged on an associated first protrusion, wherein said first protrusion protrudes inwardly from said frame, and wherein a second protrusion protrudes inwardly from said frame adjacent to the first protrusion, wherein the first and the second protrusions are connected by a magnetically soft material, and wherein the first magnetic flux guiding structure is connected via one, two, three or more spring members to the frame, and wherein the first and the second protrusion form a gap with the first magnetic flux guiding structure.

3. Optical device according to claim 1, wherein the first optical element is connected via an elastic coupling designed to provide a restoring force that tries to moves the first optical element back into an initial position, to the first magnetic flux return structure, wherein said elastic coupling elastically couples the first magnetic flux guiding structure to the first magnetic flux return structure or to a carrier frame of the optical device, and wherein said elastic coupling being designed to prevent a pull-in of the reluctance actuator by preventing the first magnetic flux guiding structure from snapping to the first magnetic flux return structure.

4. The optical device according to claim 1, further comprises a control circuit comprising an electrical energy source designed to apply an electrical current to at least one coil of the reluctance actuator having a tunable frequency.

5. The optical device according to claim 4, wherein said control circuit being designed to control said frequency such that a force on the first optical element resulting from force due to an elastic coupling and the reluctance force excites the first optical element to oscillate along said extension plane in a resonant manner such that a maximal amplitude or amplitude gain of movement of the first optical element is achieved.

6. The optical device according to claim 4, wherein said control circuit being designed to control frequency and signal shape of the current applied to the at least one coil, such that the applied current has a pulse-like signal shape.

7. The optical device according to claim 4, wherein the optical device further comprises a sensor connected to the control circuit for detecting at least one selected from the group consisting:
   position of the first optical element,
   velocity of the first optical element,
   acceleration of the first optical element.

8. The optical device according to claim 7, wherein said sensor being designed to measure at least one selected from the group consisting of:
   position of a magnet connected to the first optical element,
   a light variation caused by moving the first optical element, illuminated with a light source,
   a light variation caused by moving the first optical element, illuminated from a light source on the first optical element or fluorescing material on the first optical element,
   a speckle contrast of a transmitted light through the optical element,
   a magnetic reluctance of a magnetic path of the optical device,
   a magnetic flux in a magnetic path of the optical device,
   an induced voltage in a coil in a magnetic path of the optical device,
   an inductance or impedance of a coil in a magnetic path of the optical device,
   a current in a coil in a magnetic path of the optical device,
   a time constant of a current or a voltage of a coil in a magnetic path of the optical device,
   a change in capacitance between the moving first optical element and another area of the optical device or a second device,
   a change in an electrical field due to moving first optical element, an acceleration of the first optical element, wherein the sensor comprises an accelerometer,
movement of the first optical element acoustically,
a strain of an elastic coupling,
impedance in an electrical conductor extending along the first optical element.

9. The optical device according to claim 4, wherein the control circuit being designed to sweep the turnable frequency within a frequency range where a maximal amplitude of the first optical element is expected.

10. The optical device according to claim 1, wherein a first magnetic flux guiding structure and/or a first magnetic flux return structure extend circumferentially along said extension plane of the first optical element.

11. The optical device according to claim 1, wherein a first coil comprises an electrically conducting conductor wound around a coil axis running perpendicular to said extension plane.

12. The optical device according to claim 1, wherein a first magnetic flux guiding structure and a first magnetic flux return structure each comprise at least one protrusion being arranged offset along a first direction, and
wherein the first magnetic flux guiding structure and the first magnetic flux return structure (40) form a first gap that extends in a second direction running perpendicular to the first direction,
a control circuit is designed to apply a current to at least one coil so that a reluctance force being generated pulls the first magnetic flux guiding structure towards the first magnetic flux return structure along the first direction such that a width of the first gap and an offset between said at least one protrusions is reduced in a way that a further reluctance force (Fx) being generated pulls the first magnetic flux guiding structure towards the first magnetic flux return structure along the second direction.

13. The optical device according to claim 1, wherein a first coil comprises an electrically conducting conductor wound around an axis running parallel to the extension plane or in said extension plane along which the first optical element extends.

14. The optical device according to claim 1, wherein a first magnetic flux return structure, a first magnetic flux guiding structure and an elastic coupling are integrally connected to each other, wherein the first magnetic flux return structure, the first magnetic flux guiding structure and the elastic coupling are made from the group consisting of a single sheet of metal cut or stamped and, multiple sheets welded or bonded together.

15. The optical device according to claim 1, wherein a first magnetic flux return structure or the optical device comprises a frame, made from the group consisting of a magnetically soft material or and a non-magnetically soft material;
a first coil of the reluctance actuator being wound around or arranged on an associated first protrusion, said first protrusion protrudes inwardly from said frame, and a second protrusion protrudes inwardly from said frame, adjacent to the first protrusion, the first and the second protrusions being connected by a magnetically soft material, and
the first magnetic flux guiding structure being connected via at least one spring members to the frame, and
the first and the second protrusion form a gap with a first magnetic flux guiding structure.

16. Optical device according to claim 1, wherein the optical device comprises at least one balancing mass compensating movement of the first optical element so that the optical device does not transmit oscillations or transmits less oscillations to a surrounding coupled to the optical device.

17. Optical device according to claim 1, wherein the first optical element is selected from the group consisting of; a diffuser, a volume diffuser, a surface diffuser, a diffractive diffuser, a microlense, a line diffuser, a square diffuser, a cylinder lens array, a fly-eye, and a deformable polymer body.

18. Optical device according to claim 1, further comprising: a second optical element being selected from the group consisting of, a moving optical element moved by a reluctance actuator and a static optical element, the second optical element being selected from the group consisting of a diffuser, a volume diffuser, a surface diffuser, a diffractive diffuser, a microlense, a line diffuser, a square diffuser, a cylinder lens array, a fly-eye, and a deformable polymer body.

19. A projector comprising the optical device according to claim 1, wherein said optical device being arranged in front of said an integrator rod or beam homogenizer being a part of the projector, to provide said integrator rod or beam homogenizer with speckle-free or speckle-reduced light.

20. The projector according to claim 19, wherein a light angle intensity distribution modifying element is placed in front of the optical device (1).

21. An optical device configured to reduce speckle noise of laser light, said device comprising:
a first optical element extending along an extension plane;
a reluctance actuator designed to move or stretch said first optical element along said extension plane;
wherein said reluctance actuator is designed to exert a reluctance force on the first optical element to move or stretch the first optical element along said extension plane, wherein the optical device comprises a control circuit comprising an electrical energy source designed to apply an electrical current to the at least one first coil of the reluctance actuator having a tunable frequency; and
wherein the optical device comprises a sensor connected to the control circuit for detecting at least one selected from the group consisting of: position of the first optical element, velocity of the first optical element, acceleration of the first optical element, and wherein said sensor is designed to measure at least one of:
position of a magnet connected to the first optical element;
a light variation caused by moving the first optical element, illuminated with a light source;
a light variation caused by moving the first optical element, illuminated from a light source on the first optical element or fluorescing material on the first optical element;
a speckle contrast of the transmitted light through the optical element;
a magnetic reluctance of a magnetic path of the optical device;
a magnetic flux in a magnetic path of the optical device;
an induced voltage in a coil in a magnetic path of the optical device;
an inductance or impedance of a coil in a magnetic path of the optical device, a current in a coil in a magnetic path of the optical device;
a time constant of a current or a voltage of a coil in a magnetic path of the optical device;
a change in capacitance, in a single-ended fashion or in a differential fashion, between the moving first optical element and another area of the optical device or a second device in form of a nearby electrode;

a change in an electrical field due to moving first optical element;

an acceleration of the first optical element, wherein the sensor comprises an accelerometer;

movement of the first optical element acoustically;

a strain of an elastic coupling;

impedance in an electrical conductor extending along the first optical element.

22. An optical device configured to reduce speckle noise of laser light, comprising a first optical element extending along an extension plane;

a reluctance actuator designed to move or stretch said first optical element along said extension plane;

wherein said reluctance actuator is designed to exert a reluctance force on the first optical element to move or stretch the first optical element along said extension plane, and wherein the first magnetic flux guiding structure and the first magnetic flux return structure each comprise at least one protrusion, wherein said protrusions are arranged offset along a first direction, and wherein the first magnetic flux guiding structure and the first magnetic flux return structure form a first gap that extends in a second direction running perpendicular to the first direction, wherein a control circuit is designed to apply a current to the at least one first coil so that a reluctance force is generated that pulls the first magnetic flux guiding structure towards the first magnetic flux return structure along the first direction such that the width of the first gap and said offset between said protrusions is reduced in a way that a further reluctance force is generated which pulls the first magnetic flux guiding structure towards the first magnetic flux return structure along the second direction.

23. An optical device configured to reduce speckle noise of laser light, comprising:

a first optical element extending along an extension plane;

a reluctance actuator designed to move or stretch said first optical element along said extension plane;

wherein said reluctance actuator is designed to exert a reluctance force on the first optical element to move or stretch the first optical element along said extension plane; and wherein a first magnetic flux return structure of said reluctance actuator, a first magnetic flux guiding structure of the reluctance actuator and an elastic coupling are integrally connected to each other, wherein the first magnetic flux return structure, the first magnetic flux guiding structure and the elastic coupling are cut or stamped from a single sheet of metal or are made of multiple sheets welded or bonded together.

* * * * *